United States Patent
Nagata et al.

(10) Patent No.: US 9,720,104 B2
(45) Date of Patent: Aug. 1, 2017

(54) SCINTILLATOR PANEL, RADIATION DETECTOR, AND METHODS FOR MANUFACTURING SCINTILLATOR PANEL AND RADIATION DETECTOR

(71) Applicant: Konica Minolta, Inc., Tokyo (JP)

(72) Inventors: Yasushi Nagata, Kodaira (JP); Atsushi Hasegawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 30 days.

(21) Appl. No.: 14/922,877

(22) Filed: Oct. 26, 2015

(65) Prior Publication Data

US 2016/0223689 A1 Aug. 4, 2016

(30) Foreign Application Priority Data

Oct. 28, 2014 (JP) .................................. 2014-219351

(51) Int. Cl.
*G21K 4/00* (2006.01)
*G01T 1/202* (2006.01)

(52) U.S. Cl.
CPC ............... *G01T 1/202* (2013.01); *G21K 4/00* (2013.01)

(58) Field of Classification Search
CPC ................................... G01T 1/202; G21K 4/00
See application file for complete search history.

(56) References Cited

U.S. PATENT DOCUMENTS

| | | | | |
|---|---|---|---|---|
| 2014/0353508 A1* | 12/2014 | Nagata | ..................... | G21K 4/00 250/361 R |
| 2014/0361182 A1* | 12/2014 | Hasegawa | ............... | G01T 1/202 250/367 |
| 2015/0021484 A1* | 1/2015 | Isa | .......................... | G01T 1/202 250/361 R |

FOREIGN PATENT DOCUMENTS

WO          2010032503 A1     3/2010

\* cited by examiner

*Primary Examiner* — Mark R Gaworecki
(74) *Attorney, Agent, or Firm* — Lucas & Mercanti, LLP

(57) ABSTRACT

In a scintillator panel, a phosphor includes plural columnar crystals located on a columnar crystal growth starting surface of a scintillator layer, roots of the plural columnar crystals exist independently from each other, and a thickness region from the columnar crystal growth starting surface up to a height of 5 μm has a radiation absorptivity x of from 5.4 to 8.6%. The scintillator panel can provide radiation images having higher sharpness.

11 Claims, 3 Drawing Sheets

SCINTILLATOR PANEL, RADIATION DETECTOR, AND METHODS FOR MANUFACTURING SCINTILLATOR PANEL AND RADIATION DETECTOR

CROSS-REFERENCE TO RELATED APPLICATION

This present U.S. patent application claims a priority under the Paris Convention of Japanese patent application No. 2014-219351 filed on Oct. 28, 2014, the entirety of which is incorporated herein by reference.

FIELD OF INVENTION

The present invention relates to a scintillator panel for use in forming a radiation image, a radiation detector, and methods for manufacturing the scintillator panel and the radiation detector.

BACKGROUND OF THE INVENTION

Conventionally, radiation images such as X-ray images are widely used to diagnose symptoms in medical practice. Particularly, radiation images using an intensifying screen-film system are still used in medical practices worldwide, as an imaging system exhibiting both high reliability and excellent cost performance, as a result of achievement of high sensitivity and high image quality in a long history. However, such image information is so-called analog image information that cannot be subjected to flexible image processing and cannot be instantaneously electrically transmitted, unlike digital image information currently continuing to be developed.

Recent years have seen the appearance of digital radiation detectors typified by radiation detectors of computed radiography (CR) type, flat panel type (flat panel detectors: FPD),and the like. In these radiation detectors, a digital radiation image can be directly acquired and can be directly displayed on an image display device such as a cathode-ray tube panel or a liquid crystal panel, thereby making it unnecessary to form an image on a photographic film. Consequently, such digital radiation detectors, for example, X-ray detectors, reduce the necessity of image formation by a silver salt photographic system, thus greatly improving convenience in diagnostic work in hospitals and clinics.

One of digital technologies relating to X-ray images is computed radiography (CR), which is currently used in medical facilities. However, X-ray images acquired by CR are insufficient in sharpness and spatial resolution as compared to those acquired by screen-film systems such as a silver salt photographic system, and the image quality level thereof is still far from that of screen-film systems. Thus, as another new digital X-ray imaging technology, for example, flat X-ray detectors (Flat Panel Detectors: FPDs) using thin film transistors (TFTs) have been developed.

FPDs as mentioned above convert an X-ray to visible light by using, in principle, a scintillator panel including a phosphor layer made of an X-ray phosphor having properties that convert an applied X-ray to visible light to emit light. Radiography using a low-dose X-ray source requires use of a scintillator panel high in light emission efficiency, which is conversion efficiency from an X-ray to visible light, in order to improve a ratio of signal to noise (a S/N ratio) detected from the scintillator panel. In general, the light emission efficiency of a scintillator panel is determined by the thickness of a phosphor layer and the X-ray absorption coefficient of a phosphor. As the thickness of the phosphor layer increases, emission light generated in the phosphor layer by X-ray irradiation scatters more easily in the scintillator layer, thereby reducing sharpness of an X-ray image that is acquired via the scintillator panel. Accordingly, setting a level of sharpness necessary for image quality of an X-ray image naturally leads to the determination of a limit to the film thickness of the phosphor layer in the scintillator panel.

As used herein, the term phosphor is also referred to as scintillator, and the term "phosphor layer" is also referred to as scintillator layer.

Additionally, the shape of the phosphor forming the phosphor layer is also important in obtaining a scintillator panel that can provide X-ray images having high brightness and high sharpness. Many scintillator panels employ a phosphor having a columnar crystal shape as a phosphor forming a scintillator layer, and are usually formed by arranging a plurality of such columnar crystals on a substrate, a support body, or the like. As used herein, each of the columnar crystals forming the scintillator layer has a shape extending perpendicularly to a main surface of the substrate, the support body, or the like so that each columnar crystal can efficiently discharge emission light generated in the scintillator layer in the direction perpendicular to the main surface thereof. Scintillator panels employing such a layout in the scintillator layer can maintain the brightness and sharpness at high levels, as well as high strength in the direction perpendicular to the substrate, the support body, or the like. The phrase "the direction perpendicular to the substrate, the support body, or the like" may be hereinafter referred to as "film thickness direction".

In recent years, various studies and attempts have been made to focus on a crystal shape of a phosphor forming a scintillator layer.

For example, Patent Literature 1: WO 2010/032503 discloses a radiation conversion panel in which a phosphor layer including a phosphor matrix that forms columnar crystals having a specific shape are provided on a substrate, as a radiation conversion panel that can obtain X-ray images having high brightness and high sharpness. In the radiation conversion panel described in Patent Literature 1, the phosphor layer includes a first phosphor layer made of the phosphor matrix and having a film thickness within a specific range and a second phosphor layer including the phosphor matrix and an activator. Then, Patent Literature 1 teaches that high sharpness is obtained when, in the columnar crystals of the phosphor forming the phosphor layer, a ratio of a crystal diameter at a height of 10 μm from a substrate side to a crystal diameter at an outermost surface of the scintillator layer is within a specific range.

However, even the radiation conversion panel described in Patent Literature 1 still has room for improvement in terms of the sharpness of radiation images to be obtained.

Specifically, the radiation conversion panel described in Patent Literature 1 defines a ratio of an average circle-equivalent diameter "a" at the position of 10 μm from the substrate to an average circle-equivalent diameter "b" at the outermost surface in the columnar crystals of the phosphor layer, but defines nothing about a range of below 10 μm. Thus, sharpness of radiation images to be obtained is still likely to be further improved by allowing the shape, properties, or the like of the columnar crystals to be more precisely controlled in the region of below 10 μm in the columnar crystals.

BRIEF SUMMARY OF THE INVENTION

While aspects of the present invention will be described below, the invention is not limited thereto.

A scintillator panel according to an aspect of the present invention includes a support body and a scintillator layer formed on the support body, the scintillator layer including a phosphor and the phosphor including a plurality of columnar crystals, in which the scintillator layer has a columnar crystal growth starting surface on which roots of the plurality of columnar crystals exist independently from each other, and in which in the scintillator layer, a thickness region from the columnar crystal growth starting surface up to a height of 5 μm has a radiation absorptivity x of from 5.4 to 8.6%.

A radiation detector according to an aspect of the invention includes the scintillator panel and a photoelectric conversion element panel.

A radiation detector according to an aspect of the invention includes a photoelectric conversion element panel and a scintillator layer formed on the photoelectric conversion element panel, the scintillator layer including a phosphor, and the phosphor including a plurality of columnar crystals, in which the scintillator layer has a columnar crystal growth starting surface on which roots of the plurality of columnar crystals exist independently from each other, and in which in the scintillator layer, a thickness region from the columnar crystal growth starting surface up to a height of 5 μm has a radiation absorptivity x of from 5.4 to 8.6%.

A method for manufacturing a scintillator panel according to an aspect of the invention includes depositing a phosphor on a surface of a support body or a laminated body including at least one layer provided on the support body, which is a surface on which a scintillator layer is to be formed and whose surface energy measured according to a contact angle method (a liquid droplet method) is from 20 to 65 mJ/m$^2$, under conditions with a support body temperature of from 5 to 320° C., a deposition rate of from 5 to 200 nm/s, and a pressure of from $10^{-3}$ to 1 Pa (an absolute pressure).

A method for manufacturing a radiation detector according to an aspect of the invention includes coupling a scintillator panel manufactured by the method for manufacturing a scintillator panel with a photoelectric conversion element panel.

In addition, a method for manufacturing a radiation detector according to an aspect of the invention includes depositing a phosphor on a surface of a photoelectric conversion element panel, which is a surface on which a scintillator layer is to be formed and whose surface energy measured according to a contact angle method (a liquid droplet method) is from 20 to 65 mJ/m$^2$, under conditions with a support body temperature of from 5 to 320° C., a deposition rate of from 5 to 200 nm/s, and a pressure of from $10^{-3}$ to 1 Pa (an absolute pressure).

BRIEF DESCRIPTION OF THE SEVERAL VIEWS OF THE DRAWING

FIG. 1A is a diagram illustrating a scintillator panel 10 including a support body 11 and a scintillator layer 12 formed on the support body 11, and also showing the thickness direction and a height of columnar crystals 120 in the scintillator layer 12 of the scintillator panel 10, where the thickness direction of the scintillator layer and the height of the columnar crystals are similarly applied to the radiation detector.

FIG. 1B is a diagram illustrating a second radiation detector 31 including a photoelectric conversion element panel 20 and a scintillator layer formed on the photoelectric conversion element panel 20;

DETAILED DESCRIPTION OF THE INVENTION

Figure 1A:
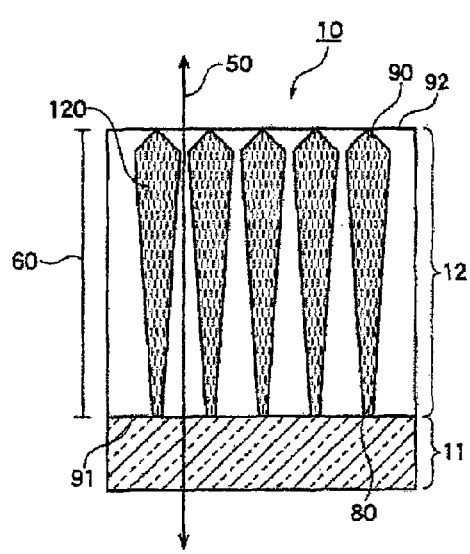
FIGS. 1A is a schematic diagram showing exemplary structures of a scintillator panel and a radiation detector according to embodiments of the present invention, the diagrams being sectional views of surfaces parallel to thickness directions of the scintillator panel and the radiation detector.

Hereinafter, a detailed description will be given of a scintillator panel, a radiation detector, and methods for manufacturing the scintillator panel and the radiation detector according to embodiments of the present invention. The invention is, however, not limited thereto.

[Scintillator Panel]

The scintillator panel according to an embodiment of the present invention includes a support body and a scintillator layer formed on the support body.

The scintillator layer includes a phosphor, and the phosphor comprises a plurality of columnar crystals. Roots of the plurality of columnar crystals located on a columnar crystal growth starting surface of the scintillator layer exist independently from each other. In the scintillator layer, a thickness region from the columnar crystal growth starting surface up to a height of 5 μm has a radiation absorptivity x of from 5.4 to 8.6%.

The scintillator panel according to the present embodiment of the invention can provide radiation images having higher sharpness as compared to conventional scintillator panels.

In obtaining a radiation image of a subject, the scintillator panel absorbs a radiation having passed through the subject in the scintillator layer to generate emission light. The emission light includes information of the subject. By coupling the scintillator panel to a photoelectric conversion element panel to be described later to form a radiation detector, the information included in the emission light can be converted into an electrical signal and acquired as a radiation image.

The radiation is preferably X-ray in terms of general versatility and the like. The same applies to the radiation detector to be described later.

Hereinafter, a description will be given of the scintillator panel according to the present embodiment of the invention.

Support Body

The scintillator panel of the embodiment includes a support body.

The "support body" is one of layers forming the "scintillator panel" and serves as a base for columnar crystals in forming a scintillator layer. In addition, the support body also plays a role of maintaining the structure of the scintillator layer.

On the other hand, in the present specification, the photoelectric conversion element panel of the radiation detector in which the scintillator layer is directly formed on the photoelectric conversion element panel is not referred to as support body and distinguished from the support body.

Examples of a raw material of the support body include films, sheets, and plates made of various kinds of glasses, polymers, metals, and the like that allow a radiation such as X-ray to pass therethrough. Specific examples of the raw material of the support body include plate glasses such as quartz, borosilicate glass, and chemically reinforced glasses; amorphous carbon plates; plate-shaped ceramics such as sapphire, silicon nitride, and silicon carbide; semiconductor plates molded from silicon, germanium, gallium arsenide, gallium phosphide, and gallium nitride; polymer films (plastic films) such as cellulose acetate films, polyester resin films, polyethylene terephthalate films, polyamide films, polyimide films, triacetate films, and polycarbonate films, and polymer sheets (plastic sheets) such as carbon fiber-reinforced resin sheets; metal sheets such as aluminum sheets, iron sheets, and copper sheets, or metal sheets having coat layers made of oxides of the metals; and bio-nanofiber films. The support body may be formed by one layer of any of the above raw materials or may be formed by the same or different kinds of two or more layers of any thereof.

The support body is preferably a film or sheet with a thickness of from 50 to 500 μm having flexibility.

As used herein, the phrase "having flexibility" means "being flexible" where an elastic modulus thereof at 120° C. (E120) is from 0.1 to 300 GPa.

The elastic modulus (E120) of the support body is more preferably from 1 to 100 GPa. The term "elastic modulus" is a value obtained as an inclination of a stress with respect to an amount of strain in a region indicating a linear relationship between a strain indicated by a bench mark for a sample based on JIS-C2318 and a stress corresponding thereto, by using a tensile strength tester. This is a value referred to as Young's modulus, which is defined as elastic modulus.

As the raw material of the support body having flexibility, particularly preferred are flexible polymer films and flexible polymer sheets with a thickness of from 50 to 500 μm, among the raw materials mentioned above.

Specific examples of the flexible polymer films include polyethylene naphthalate films (E120=7 GPa), polyethylene terephthalate films (E120=4 GPa), polycarbonate films (E120=2 GPa), polyimide films (E120=7 GPa), polyether imide films (E120 =3 GPa), aramid films (E120=12 GPa), polysulfone films (E120 =2 GPa), polyether sulfone films (E120=2 GPa), and bio-nanofiber films. The value of elastic modulus can vary among the same kinds of polymer films and is therefore not necessarily the same as those in the parentheses. Each of the values in the parentheses is one example for reference.

The polymer films mentioned above all have high heat resistance and are preferable in terms of being resistant to deposition of a phosphor. Particularly preferred are polyimide films from the viewpoint that they are excellent in heat resistance and suitable for forming columnar crystals of a phosphor (scintillator) by a gas phase process using cesium iodide (CsI) as a raw material.

The polymer film having flexibility may be a film made of a single polymer compound or a film made of a mixture of any of the polymer compounds mentioned above.

The support body may be formed by a single layer of a polymer film having flexibility or two or more layers of the same kind or different kinds of polymer films having flexibility.

In addition, when the support body is formed by a bio-nanofiber film, there can be obtained advantages, such as that the bio-nanofiber film is: (i) lightweight; (ii) strong, equal to or more than five times as strong as iron (high strength); (iii) hardly expanded by heat (low heat expandability); (iv) flexible (high flexibility); (v) processable in various manners, such as mixing, coating, and forming into a film; and (vi) a plant fiber that causes less environmental impact when disposed of.

The support body may be provided with light absorbing properties and light reflecting properties, for example, by coloring in order to adjust a reflectivity thereof. In other words, the support body may has also a function of serving as a reflecting layer. Examples of such a support body include white PET and black PET in which a white pigment or carbon black is kneaded in a support body.

Scintillator Layer

In the scintillator panel of the present embodiment of the invention, the scintillator layer is formed on the support body.

The scintillator layer may be directly formed on the support body or indirectly formed on the support body via a layer other than the scintillator layer and the support body, such as a reflecting layer.

Specifically, in the scintillator panel according to the present embodiment, there can be employed a layer structure, for example, such as "support body/scintillator layer" or "support body/reflecting layer/scintillator layer".

The scintillator layer has a function of converting energy of a radiation such as X ray input from outside into light such as visible light.

The terms "phosphor" and "scintillator" include "a phosphor not activated by an activator" and "a phosphor activated by an activator". Hereinafter, "phosphor not activated by an activator" will also be referred to as "phosphor (pure)", and "phosphor activated by an activator" will also be referred to as "activated phosphor".

"Light" is, among electromagnetic waves, an electromagnetic wave of a wavelength region with visible light at the center ranging from an ultraviolet region to an infrared region, specifically, an electromagnetic wave having a wavelength of from 300 to 800 nm.

A phosphor matrix compound is not particularly limited as long as it is a raw material that can efficiently convert energy of a radiation such as X ray input from outside into light and can form columnar crystals. Accordingly, as long as the above conditions are satisfied, conventionally known various kinds of phosphors (pure) can be used as the phosphor matrix compound.

As used herein, the term "phosphor matrix compound" is a phosphor (pure), which is a raw material for forming the columnar crystals of the phosphor forming the scintillator layer.

Among the phosphor matrix compounds, suitable are halide phosphors of cubic crystal systems, such as cesium iodide (CsI), gadolinium oxysulfide (GOS), cadmium tungstate (CWO), gadolinium silicate (GSO), bismuth germanate (BGO), lutetium silicate (LSO), and lead tungstate (PWO). Particularly preferred are halide phosphors of cubic crystal systems in terms of improvement in sharpness of radiation images to be obtained.

In addition, among the halide phosphors of cubic crystal systems, CsI is particularly preferable from the viewpoint that conversion efficiency from an X ray into visible light is relatively high, columnar crystals is easily formed by vapor deposition, and scattering of emission light in crystal is suppressed by a light guiding effect due to the crystal structure, so that the scintillator layer can be thickened accordingly to that effect.

The phosphor matrix compound is not particularly limited to an instantaneously light-emitting phosphor such as CsI, and may be a photostimulable phosphor such as cesium bromide (CsBr) depending on the purpose of the scintillator panel.

In the scintillator panel according to the present embodiment of the invention, the scintillator layer may include an activator. The activator activates a phosphor compound, so that high light emission efficiency can be achieved.

An example of a scintillator layer including an activated phosphor is a scintillator layer including CsI:Na, which is an activated phosphor obtained by activating CsI with an optional amount of sodium iodide (NaI), as disclosed in Japanese Examined Patent Application Publication No. 54-35060. In addition, among scintillator layers including an activated phosphor, preferred is a scintillator layer including any activated phosphor or a plurality of activated phosphors among CsI:Tl, CsI:Eu, CsI:In, CsI:Li, CsI:K, CsI:Rb, CsI:Na, and the like, for example, as disclosed in Japanese Unexamined Patent Application Publication No. 2001-59899.

In the present embodiment of the invention, a phosphor activated by an activator may be expressed as "phosphor: activator (light emission center)". For example, cesium iodide activated by a thallium compound such as thallium iodide is expressed as "CsI:Tl ".

In the scintillator panel according to the present embodiment of the invention, preferred is a scintillator layer formed by using an activator including, particularly, one or two or more kinds of thallium compounds and a phosphor, as a raw material, and more preferred is a scintillator layer formed by using an activator including one or two or more kinds of thallium compounds and cesium iodide, as a raw material. Particularly preferred is a scintillator layer formed by using an activator including at least one thallium compound and cesium iodide, as a raw material, since a thallium-activated cesium iodide (CsI:Tl) formed from the raw material has a wide light emission wavelength ranging from 300 to 750 nm.

Examples of the thallium compounds include monovalent thallium compounds and trivalent thallium compounds. More specific examples thereof include thallium iodide (TlI), thallium bromide (TlBr), thallium chloride (TlCl ), and fluoride thallium (TlF, $TlF_3$). Among these compounds, thallium iodide (TlI) is preferable from the viewpoint that it is excellent in activating phosphors, particularly, CsI.

In addition, the thallium compound has a melting point in a range of preferably from 400 to 700° C. When the melting point of the thallium compound is in the above range, the activator is taken into the columnar crystals of the phosphor in the scintillator layer formed by vapor deposition, as a result of which light emission efficiency of the activated phosphor to be obtained is improved as compared to light emission efficiency of a phosphor (pure). Melting point is usually a melting point under normal pressure, and the normal pressure is approximately 0.101 MPa.

The scintillator layer of the scintillator panel according to the present embodiment of the invention has a relative activator content of preferably from 0.1 to 5 mol %.

As used herein, the relative activator content in the scintillator layer represents a relative value where a total amount of the activator contained in the raw material of the scintillator layer is expressed by mol % when a total amount of the phosphor matrix compound contained in the raw material of the scintillator layer is 100 mol %.

In an example in which the phosphor matrix compound is 1 mol of CsI and the activator is 0.01 mol of TlI, a molar amount of the activator is $1/100$ of a molar amount of the phosphor matrix compound. Thus, a relative activator content with respect to 100 mol % of the phosphor matrix compound is 1 mol %.

As described above, the relative activator content in the scintillator layer is not directly calculated from an amount of a component forming the phosphor in the scintillator layer but a raw material conversion value.

The relative activator content is obtained by cutting out a region as a target for measurement from the scintillator layer by using a cutter or the like and then measuring using inductively-coupled-plasma optical emission spectrometry (ICP-OS). The ICP optical emission spectrometry may be performed according to a usual method. Examples of an ICP optical emission spectrometer usable include SPS3100 manufactured by Seiko Instruments Inc.

The phosphor forming the scintillator layer includes the plurality of columnar crystals. Roots of the plurality of columnar crystals exist independently from each other. Whether the roots thereof are independent from each other or fused with each other can be confirmed by observing through an electron microscope.

The "roots of the columnar crystals of the phosphor" are portions of the columnar crystals of the phosphor that are in contact with a columnar crystal growth starting surface of the scintillator layer (see reference sign 80 of FIG. 1A).

In addition, a thickness region of 5 µm from the columnar crystal growth starting surface in the scintillator layer is assumed to be a "root portion of the scintillator layer".

Portions of the columnar crystals of the phosphor that are in contact with a columnar crystal growth ending surface of the scintillator layer are referred to as "tips of the columnar crystals of the phosphor" (see reference sign 90 of FIG. 1A), and a thickness region of 5µm from the columnar crystal growth ending surface of the scintillator layer is referred to as a "tip portion of the scintillator layer".

In the scintillator panel according to the present embodiment of the invention, the roots of the columnar crystals are independent from each other. Thereby, when pressure is applied to the scintillator panel from a film thickness direction, a load applied to the columnar crystals is dispersed. Thus, the columnar crystals are hardly deformed, so that there can be obtained an effect of enhancing durability of the scintillator panel.

For example, when the columnar crystals are fused at the roots thereof of the phosphor forming the scintillator layer, a radiation absorptivity of the columnar crystals at root portions increases according to the degree of the fusion. Then, when the radiation absorptivity of the columnar crystals at the root portions exceeds a certain range, sharpness of a radiation image to be obtained decreases.

In the scintillator panel according to the present embodiment of the invention, in the scintillator layer, the thickness region from the columnar crystal growth starting surface to the height of 5 μm, that is, at the root portions, has a radiation absorptivity x of from 5.4 to 8.6%, preferably from 6.7 to 8.6%.

The radiation absorptivity of the columnar crystals at the root portions is associated with whether the root portions exist independently from each other or are fused with each other. When the radiation absorptivity x is within the above range, the root portions exist independently from each other, whereas when it exceeds the range, the root portions are fused with each other.

In the present specification, when a radiation is applied to a subject that absorbs the radiation, the "radiation absorptivity" represents a ratio (%) of an energy of the radiation absorbed into the subject with respect to a total energy (100%) of the applied radiation.

By making the columnar crystals present at the root portions of the columnar crystals exist independently from each other to set so that the radiation absorptivity of the columnar crystals at the root portions is within a specific range, sharpness of a radiation image to be obtained can be improved as compared to radiation image panels as disclosed in Patent Literature 1 and the like.

The radiation absorptivity at the root portions can be obtained from a ratio between doses measured in the presence and absence of the scintillator panel by a radiation dosimeter.

In the scintillator panel according to the present embodiment of the invention, the radiation is X-ray. A ratio (x/y) between the X-ray absorptivity x of the thickness region from the columnar crystal growth starting surface up to the height of 5 μm and an X-ray absorptivity y of a thickness region from the columnar crystal growth starting surface up to a height of 150 μm is preferably from 0.11 to 0.22, more preferably from 0.12 to 0.22, and still more preferably from 0.17 to 0.22. When the ratio (x/y) is within the above range, a radiation image having higher sharpness can be provided via a radiation detector including the scintillator panel according to the present embodiment and a photoelectric conversion element panel.

In the scintillator panel according to the present embodiment of the invention, furthermore, the X-ray absorptivity x of the thickness region from the columnar crystal growth starting surface up to the height of 5 μm in the scintillator layer is within the above range; the X-ray absorptivity y of the thickness region from the columnar crystal growth starting surface up to the height of 150 μm in the scintillator layer is preferably from 39.3 to 50%, more preferably from 39.3 to 44.0%, and still more preferably from 39.3 to 42.1%. When the X-ray absorptivity x and the X-ray absorptivity y are within the above ranges, a radiation image having higher sharpness can be provided via a radiation detector including the scintillator panel according to the present embodiment of the invention and a photoelectric conversion element panel.

The X-ray absorptivity x and the X-ray absorptivity y of the specific thickness regions such as the root portions, and the ratio (x/y) of the X-ray absorptivity x to the X-ray absorptivity y can be achieved by controlling a surface energy of the layer directly forming the scintillator layer to from 20 to 65 mJ/m$^2$. In addition, the columnar crystals of the scintillator layer are preferably gas phase deposits formed by a gas phase deposition process. When the scintillator layer is formed by vapor deposition, the ratio can be achieved, besides the control of the surface energy, by adjusting the temperature, the deposition rate, and the degree of vacuum of the layer directly forming the scintillator layer during vapor deposition.

The surface energy can be measured by a contact angle method (a liquid droplet method). Details of the measurement method will be given in Examples to be described later.

The scintillator layer may be formed by one layer or two or more layers. When the scintillator layer is formed by two or more layers, it may be formed to include a layer serving as a base layer and laminate the base layer and a layer other than the base layer in this order or may be formed to include no base layer. When the scintillator layer is formed by two or more layers including a base layer, these layers can be made of the same or different materials as long as the same phosphor matrix compound is included. In other words, the scintillator layer may be (1) one layer formed from a raw material including a phosphor matrix compound and an activator, (2) a base layer formed from a raw material including a phosphor matrix compound alone and a layer other than the base layer, formed from a raw material including the phosphor matrix compound and an activator, or (3) a base layer formed from a raw material including a phosphor matrix compound and a first activator and a layer other than the base layer, formed from a raw material including the phosphor matrix compound and a second activator.

When forming the scintillator layer in which the roots of the columnar crystals are independent from each other, it is preferable to use no activator as a raw material for forming the base layer in terms of reproducibility with high precision. However, this does not mean that the formed base layer should not include any component derived from an activator. After forming the scintillator layer, for example, heating or the like may cause an activator-derived component to be moved from a layer other than the base layer to the base layer, as a result of which the base layer may include the activator-derived component.

Additionally, in the present specification, "base layer" refers to a part of the scintillator layer, and which is, of the layers forming the scintillator layer, an outermost layer on a columnar crystal growth starting surface side.

In the present invention, the scintillator layer is preferably a scintillator layer that includes: (i) a layer other than a base layer, formed by using a raw material including a phosphor matrix compound and an activator; and (ii) the base layer that is provided between the support body and the layer other than the base layer, whose raw material includes the phosphor matrix compound but does not include any activator, and whose porosity has a higher value than the layer other than the base layer.

The presence of the base layer makes the properties of the columnar crystals favorable, whereby an amount of light emission by the phosphor increases and the brightness of a radiation image to be obtained improves. In addition, storage stability of the scintillator panel improves, so that a radiation image having improved brightness can be obtained stably for a long period of time.

As used herein, the term porosity means a ratio of a total sectional area of voids to a sum of a total sectional area of the columnar crystals of the phosphor and the total sectional area of the voids in a section obtained by cutting the scintillator layer in parallel to the columnar crystal growth starting surface.

The porosity can be obtained by cutting the scintillator layer of the scintillator panel in parallel to the columnar crystal growth starting surface and then binarizing columnar crystal portions of the phosphor and void portions in a scanning electron micrograph of the obtained section by image processing software.

When an amount of the phosphor matrix compound of the base layer is assumed to be 100 mol %, the base layer has a relative activator content of preferably from 0.01 to 1 mol %, and more preferably from 0.3 to 0.7 mol %. It is much preferable to set the relative activator content of the base layer to be within the above range in terms of improvement in the brightness of a radiation image and storage stability of the scintillator panel.

A degree of orientation based on an X-ray diffraction spectrum of a surface having a specific plane index of the phosphor in the scintillator layer is preferably within a range of from 80 to 100% regardless of the position in the thickness direction of the scintillator layer from the viewpoint of light emission efficiency of the scintillator layer and the like. For example, the plane index of columnar crystal of thallium-activated cesium iodide (CsI:Tl) can be anyone of (100), (110), (111), (200), (211), (220), (311), and the like. However, in the present embodiment, the plane index to be used in X-ray measurement is preferably (200). Details of plane indices are described in pp. 42 to 46 of "X-sen Kaiseki Nyumon (Introduction to X-Ray Analysis)" (published by Tokyo Kagaku Dojin Co. Ltd).

As used herein, the phrase "the thickness direction of the scintillator layer" refers to a direction orthogonal to a main surface of the scintillator layer, as indicated by an arrow of FIG. 1.

In addition, the phrase "a degree of orientation based on X-ray diffraction spectrum of a surface having a specific plane index" refers to a ratio of an intensity Ix of a certain plane index to a total intensity I of an overall including surfaces having other plane indices. For example, the degree of orientation at an intensity I200 of the (200) surface in X-ray diffraction spectrum is expressed as "orientation degree=I200/I".

An example of a method for measuring a plane index for determining an orientation degree is X-ray diffraction (XRD). X-ray diffraction is a highly versatile analytical technique that can obtain findings relating to identification of a substance, a crystal phase structure, and the like by irradiating a crystalline substance with a specific X-ray having a specific wavelength and thereby using an occurrence of diffraction that satisfies Bragg's equation. Examples of a target for irradiation system include Cu, Fe, and Co. Typically, the output at a time of irradiation is approximately from 0 to 50 mA and 0 to 50 Kv, although depending on device abilities.

In the scintillator panel according to the present embodiment of the invention, the thickness of the scintillator layer is preferably from 100 to 1000 μm, more preferably from 100 to 800 μm, and still more preferably from 120 to 700 μm from the viewpoint that there is a good balance between the brightness and the sharpness of a radiation image to be obtained via the scintillator panel according to the present embodiment.

The film thickness of the base layer is preferably from 0.1 to 50 μm, more preferably from 3 to 50 μm, and still more preferably from 5 to 40 μm in terms of maintaining high brightness and sharpness of a radiation image to be obtained.

In addition, regarding a crystal diameter of the columnar crystals forming the scintillator layer, when the columnar crystal growth starting surface of the scintillator layer is assumed to be at a reference position, an average crystal diameter h of the columnar crystals at a position of a height of 1 μm and an average crystal diameter i of the columnar crystals at a position of a height of 3 μm satisfy a relationship of preferably $1 \leq (i/h) \leq 3$, and more preferably $1 \leq (i/h) \leq 2$. When the value of (i/h) is 3 or less, it does not occur that a pressure, when applied in the film thickness direction of the scintillator panel, is excessively concentrated on one point and thereby the columnar crystals are deformed. Thus, it is advantageous in terms of maintaining the strength of the scintillator layer and eventually maintaining the strength of the scintillator panel. On the other hand, the value (i/h) can generally easily be set to 1 or more in a manufacturing process.

As used herein, the term "height" means a distance in a perpendicular direction from the columnar crystal growth starting surface of the scintillator layer to the columnar crystal growth ending surface thereof, as shown in FIG. 1.

In addition, it is more preferable to set the (i/h) to be within the above range and the average crystal diameter i to be 3 μm or less in terms of a strength with respect to a pressure from the film thickness direction of the scintillator panel. In this case, the scintillator panel has a certain level of strength even when the scintillator layer does not include any base layer. However, when the scintillator layer includes a base layer, the scintillator panel can provide a radiation image high in strength, brightness, and sharpness, having good balance between these performances.

Furthermore, an average crystal diameter c of a surface positioned at a height lower by 10 μm in a direction of a support body side from the columnar crystal growth ending surface of the scintillator layer is preferably 10 μm or less, and more preferably 8 μm or less from the viewpoint of securing the sharpness.

The term "average crystal diameter" specifically means "average circle-equivalent diameter". The "average circle-equivalent diameter" is an average crystal diameter that is obtained as follows. After coating a scintillator layer including columnar crystals with a conductive substance such as platinum palladium, gold, or carbon, the layer is observed through a scanning electron microscope (SEM) (S-800 manufactured by Hitachi, Ltd.), and, in 30 columnar crystals, circle-equivalent diameters as diameters of circles circumscribed with individual columnar crystal sections are measured to obtain an average value of the circle-equivalent diameters, as the average crystal diameter.

As used herein, each of the average crystal diameter h of the columnar crystals at the position of the height of 1 μm and the average crystal diameter i of the columnar crystals at the position of the height of 3 μm is an average crystal diameter that is obtained from observation of crystal surfaces obtained by filling insides of the crystals with an appropriate resin such as epoxy resin and cutting out crystal film surfaces by polishing up to the positions of 1 μm and 3 μm, respectively, from the columnar crystal growth starting surface of the scintillator layer.

In addition, the average crystal diameter c at the section positioned at the height low by 10 μm in the direction of the support body side from the columnar crystal growth ending surface of the scintillator layer including the columnar crystals is an average crystal diameter that is obtained from observation of crystal surfaces obtained by filling the insides of the crystals with an appropriate resin such as epoxy resin and cutting out the columnar crystals by 10 μm from the columnar crystal growth ending surface.

Layer(s) Other Than Support Body and Scintillator Layer, Forming Scintillator Panel As with conventionally known scintillator panels, the scintillator panel according to the present embodiment of the invention may further include a reflecting layer, a light shielding layer, a pigment layer, and/or the like, in addition to the support body and the scintillator layer, for example, in order to adjust the reflectivity of the panel. Additionally, besides them, the scintillator panel according to the present embodiment may further include a reflecting layer protection layer, a moisture-resistant protection layer, and/or the like.

As described above, the support body may serve also as the reflecting layer. In this case, the scintillator panel may include, as a reflecting layer, only the support body serving as the reflecting layer or may include an additional reflecting layer, besides the support body serving as the reflecting layer.

(Reflecting Layer)

A description of the reflecting layer given below is the same as in the support body serving as a reflecting layer and a reflecting layer that is provided separately from the support body.

The scintillator panel according to the present embodiment of the invention may include a reflecting layer. The reflecting layer is provided, for example, between the support body and the scintillator layer or on a surface of the support body on a side where the scintillator layer is not located.

An example of such a scintillator panel is a scintillator panel having a layer structure of "support body/reflecting layer/scintillator layer". In this case, a scintillator layer surface of the scintillator panel is attached to a surface of a photoelectric conversion element panel.

An example of the reflecting layer is a layer including a binder resin and a pigment.

The binder resin forming the reflecting layer is not particularly limited as long as the object of the present invention is not impaired. The binder resin may be a commercially available product appropriately obtained or a product appropriately manufactured. Specific examples of the binder resin include resins such as vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyvinyl butyral, and cellulose derivatives such as nitrocellulose, and styrene-butadiene copolymers, polyurethane resins, polyamide resins, polyester resins, various synthetic rubber-based resins, phenolic resins, epoxy resins, urea resins, melamine resins, phenoxy resins, silicon resins, fluorine resins, acrylic resins, and urea formamide resins. Among them, preferred are hydrophobic resins such as polyester resins and polyurethane resins in terms of having high film adhesion to the columnar crystals of the phosphor formed by vapor deposition and the support body. In addition, the binder resin may be a single resin or a mixture of two or more resins. Particularly, in a case where the binder resin is made of a polymer compound having a glass transition temperature (Tg), the binder resin is preferably a mixture of two or more resins whose glass transition temperatures (Tg) are different by 5° C. or more, from the viewpoint of facilitating the control of physical properties of a coat film obtained from a reflecting layer-forming coat liquid that contains a raw material for forming a reflecting layer, such as the binder resin. In this case, all or some of the two or more resins may be the same or different as long as the glass transition temperatures thereof are different from each other.

Examples of a pigment to be included in the binder resin forming the reflecting layer include insoluble azo pigments such as Fast Yellow, Disazo Yellow, Pyrazolone Orange, Lake Red 4R, and Naphthol Red; condensed azo pigments such as Chromophthal Yellow or Chromophthal Red; azo-lake pigments such as Lithol Red, Lake Red C, Brilliant Carmine 6B, and Bordeaux 10B; nitroso pigments such as Naphthol Green B; nitro pigments such as Naphthol Yellow S; phthalocyanine pigments such as Phthalocyanine Blue, Fast Sky Blue, and Phthalocyanine Green; threne pigments such as Anthrapyrimidine Yellow, Perinone Orange, Perylene Red, Thioindigo Red, and Indanthrone Blue; quinacridone pigments such as quinacridone red and quinacridone violet; dioxazine pigments such as dioxazine violet; isoindolinone pigments such as Isoindolinone Yellow; acid dye lakes such as Peacock Blue Lake and Alkali Blue Lake; basic dye lakes such as Rhodamine Lake, Methyl Violet Lake, and Malachite Green Lake; and carbon black.

Examples of white pigments include alumina, yttrium oxide, zirconium oxide, titanium dioxide, sulfuric acid barium, silica, zinc oxide, and calcium carbonate.

The pigment is included in a ratio of preferably from 0.01 to 10 parts by weight with respect to 100 parts by weight of a binder resin forming the reflecting layer. When the amount of the pigment is within the above range, a sufficiently colored reflecting layer can be obtained, as well as reduction in mechanical physical properties such as extension and strength of the binder resin due to excessive pigment can be prevented.

In addition, other examples of the reflecting layer include layers made of raw materials having light reflecting properties or light shielding properties, such as various kinds of metal films and amorphous carbon plates.

Among them, preferred are metallic films made of metal having high reflectivity. In the properties of metal forming such metallic films, the electric conductivity thereof is preferably 6.0 S/m or more, and more preferably 30 S/m or more. The metal forming the metallic film may be one kind alone or two or more kinds. Examples of the metallic film having high reflectivity include metallic films made of a raw material including at least one metal selected from the group consisting of Al, Ag, Cr, Cu, Ni, Mg, Pt, and Au. Among the metallic films, particularly preferred are metallic films made of Al (40 S/m), Ag (67 S/m), and Au (46 S/m) in terms of reflectivity.

The reflecting layer may be formed by one layer or two or more layers.

The film thickness of the reflecting layer depends on a method for depositing the reflecting layer. In the case of vacuum deposition, the film thickness thereof is preferably from 50 to 400 nm, and, in the case of sputter deposition, the film thickness thereof is preferably from 20 to 200 nm.

(Light Shielding Layer)

A light shielding layer may be provided between the support body and the scintillator layer or on a main surface of the support body on a side opposite to the scintillator layer. The light shielding layer includes a material having light shielding properties.

The material having light shielding properties is preferably a metallic thin film including a metal material including one or two or more atoms selected from aluminum, silver, platinum, palladium, gold, copper, iron, nickel, chromium, cobalt, and the like or stainless steel from the viewpoint of allowing the reflectivity of the support body to be appropriately adjusted. Among them, particularly preferred is a metal material containing aluminum or silver as a main component from the viewpoint of allowing the light shielding layer to have high light shielding properties and high corrosion resistance. Additionally, the light shielding layer may be formed by one layer of any of the metallic thin films or two or more layers any thereof.

When providing the light shielding layer on the support body, it is also desirable to provide an intermedium layer between the support body and the light shielding layer from the viewpoint of improving adhesion between the light shielding layer and the support body. Examples of a raw material for forming the intermediate layer include typical polymers having easy adhesion, such as epoxy resins, and metals different from the metal of the light shielding layer, that is, dissimilar metals. Examples of the dissimilar metals include nickel, cobalt, chromium, palladium, titanium, zirconium, molybdenum, and tungsten. The intermedium layer may include one or two or more of the dissimilar metals. The light shielding layer has a thickness of preferably from 0.005 to 0.3 µm, and more preferably from 0.01 to 0.2 µm from the viewpoint of emission light extraction efficiency.

The light shielding layer including any of such metallic raw materials serves also as an antistatic layer and thus can be suitably used also for preventing electrification of the scintillator panel according to the present embodiment of the invention. The light shielding layer including any of the metallic raw materials can be employed as an antistatic layer, instead of a reflecting layer containing a metallic raw material serving as an antistatic agent or together therewith. In this case, in a sample of a laminated body in which a light shielding layer including a metallic raw material is provided on a support body, a surface resistivity measured on a surface of the light shielding layer including a metallic raw material on a side opposite to the support body is preferably $1.0 \times 10^{12}$ Ω/sq or less, more preferably $1.0 \times 10^{11}$ Ω/sq or less, and most preferably $1.0 \times 10^{10}$ Ω/sq from the viewpoint of prevention of electrification of the scintillator panel according to the present embodiment of the invention.

(Pigment Layer)

A pigment layer may be provided between the support body and the scintillator layer or on the main surface of the support body on the side opposite to the scintillator layer.

The pigment layer is not particularly limited as long as it is colored with a pigment and has light absorbing properties. For example, the pigment layer is a layer including a pigment and a binder resin. The pigment of the pigment layer may be a conventionally known pigment. The pigment is preferably a blue pigment in terms of absorbing a red long-wave light component that more easily causes light scattering. Examples of such a blue pigment are inorganic blue pigments and organic blue pigments. Preferable inorganic blue pigments are those containing Ultramarine blue, Prussian blue as ferric ferrocyanide, or the like. In addition, preferable organic blue pigments are those containing azo, phthalocyanine, or the like. Among the organic blue pigments, preferred are those containing phthalocyanine from the viewpoint of radiation resistance and ultraviolet ray resistance of the pigment layer. Examples of the binder resin of the pigment layer include the same resins as those exemplified as the binder resin forming the reflecting layer. Among those resins, preferred are hydrophobic resins such as polyester resins and polyurethane resins, and more preferred are polyester resins and polyurethane resins, in terms of high film adhesion to the columnar crystals of the phosphor formed, for example, by vapor deposition and the support body. The binder resin of the pigment layer may be made of a single resin or a mixture of two or more resins, as with the binder resin forming the reflecting layer (the glass transition temperature of the binder resin is also the same as that of the binder resin forming the reflecting layer, and the same shall apply hereinafter). The pigment of the pigment layer is included in an amount of preferably from 0.01 to 10 parts by weight with respect to 100 parts by weight of the binder resin, from the viewpoint of light absorbing properties of the pigment layer.

The pigment layer has a thickness of preferably from 1 to 500 µm from the viewpoint of cuttability.

(Reflecting Layer Protection Layer)

When the scintillator panel according to the present embodiment of the invention includes a reflecting layer, a reflecting layer protection layer may be provided between the reflecting layer and the scintillator layer to prevent corrosion or the like of the reflecting layer due to the phosphor in the scintillator layer.

The reflecting layer protection layer is usually a layer including resin, and the resin included in the reflecting layer protection layer is preferably a polymer having a glass transition temperature of from 30 to 100° C., in terms of serving as a protection layer for the reflecting layer and the columnar crystals in the scintillator layer.

Specific examples of the resin included in the reflecting layer protection layer include the same resins as those exemplified as the binder resin forming the reflecting layer, and particularly preferred are polyester resins. The resin included in the reflecting layer protection layer may be a single resin or a mixture of two or more resins, as with the binder resin forming the reflecting layer.

The reflecting layer protection layer has a thickness of preferably 0.1 µm or more in terms of serving as the protection layer for the reflecting layer and the columnar crystals in the scintillator layer, and preferably 3.0 µm or less and more preferably from 0.2 to 2.5 µm in terms of securing the surface smoothness of the reflecting layer protection layer.

(Moisture-Resistant Protection Film)

In the scintillator panel according to the present embodiment of the invention, the entire outer circumference thereof is preferably covered with a moisture-resistant protection film. The moisture-resistant protection film serves to prevent the entire scintillator panel from moisture to suppress deterioration of the scintillator layer. Examples of such a deterioration include deterioration of the scintillator layer due to deliquescence of the phosphor that occurs when the phosphor of the scintillator layer is deliquescent.

The moisture-resistant protection film is a film provided with moisture-proof properties. The moisture-resistant protection film has a moisture permeability of preferably 50 g/m²/day or less, more preferably 10 g/m²/day or less, and particularly preferably 1 g/m²/day or less, in terms of preventing the deterioration of the scintillator layer.

As used herein, the moisture permeability of the moisture-resistant protection film can be measured according to a method specified by JIS Z 0208, as follows.

The moisture-resistant protection film is provided in a specified container. Then, while maintaining a temperature in the container at 40° C., a space on one side of the moisture-resistant protection film as a boundary surface is maintained at 90% RH (relative humidity) and a space on the other side thereof is maintained in a dry state by a desiccant. The mass (g) of moisture that passes through the moisture-resistant protection film for 24 hours in this state (the protection film is converted to 1 m²) is defined as the moisture permeability of the moisture-resistant protection film.

Examples of the moisture-resistant protection film include protection films having low moisture permeability and moisture-resistant films such as polyparaxylylene films.

The protection film can be, for example, a polyethylene terephthalate (PET) film. Besides PET films, examples of the protection film include polyester films other than PET films, polymethacrylate films, nitrocellulose films, cellulose acetate films, polypropylene films, and polyethylene naphthalate films.

From the viewpoint of adjusting the moisture permeability of the moisture-resistant protection film within the above range to improve moisture-proof properties of the moisture-resistant protection film, the moisture-resistant protection film is preferably a laminated film or a laminated membrane obtained by laminating a plurality of vapor-deposited films obtained by vapor depositing a metal oxide or the like, on the protection film or moisture-resistant film.

Such a laminated film or a laminated membrane is preferably a polyethylene terephthalate film or a vapor-deposited film obtained by vapor depositing an alumina thin film on or polyethylene terephthalate film.

The moisture-resistant protection film may be formed by a heat seal layer including a resin having heat seal properties.

The heat seal resin included in the heat seal layer is not particularly limited as long as the resin can be fused by a commonly used impulse sealer. Examples of the heat seal resin include ethylene-vinyl acetate copolymers (EVA), polypropylene (PP), and polyethylene (PE).

The moisture-resistant protection film has a thickness of preferably from 10 to 100 µm.

[Radiation Detector]

Figure 2:
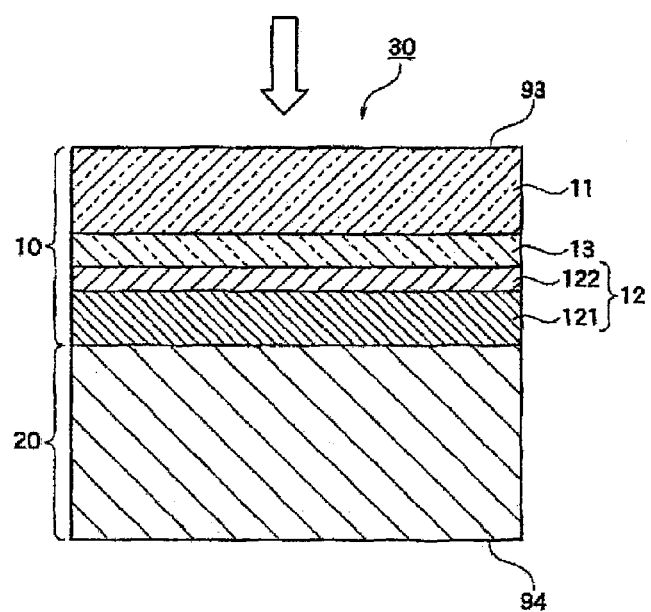
FIG. 2 is a schematic diagram showing an exemplary structure of the scintillator panel according to the an embodiment of the invention, which is a sectional view of the surfaces parallel to the thickness directions of the scintillator panel and the radiation detector.
Figure 3:
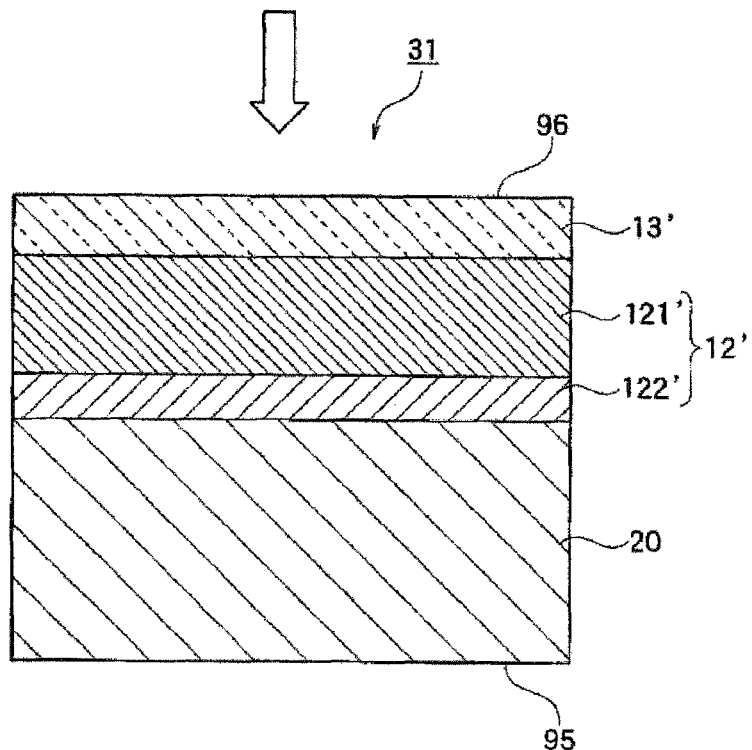
FIG. 3 is a schematic diagram showing another exemplary structure of the radiation detector according to the an embodiment of the invention, which is a sectional view of the surfaces parallel to the thickness directions of the scintillator panel and the radiation detector.

A radiation detector according to an embodiment of the present invention may be a radiation detector 30 formed by combining the above-described scintillator panel 10 including a scintillator layer 12 with a photoelectric conversion element panel 20, as shown in FIG. 2. Alternatively, the radiation detector of the embodiment may be a radiation detector 31 formed by integrating a scintillator layer 12' to be described later with the photoelectric conversion element panel 20, as shown in FIG. 3.

In the present specification, the radiation detector 30 as the former will be referred also as to "first radiation detector", and the radiation detector 31 as the latter will be referred also as to "second radiation detector".

(First Radiation Detector)

A first radiation detector according to an embodiment of the invention includes the above-described scintillator panel and a photoelectric conversion element panel.

The first radiation detector according to the present embodiment thereof is obtained, for example, by coupling a scintillator panel obtained by directly forming a scintillator layer on a support body by vapor deposition or the like with a separately produced photoelectric conversion element panel, and is a so-called "detachable FPD".

In the first radiation detector, preferably, a scintillator layer surface of the scintillator panel is directly attached to a planar light receiving element surface of the photoelectric conversion element panel, from the viewpoint such as that emission light generated in the scintillator layer can be efficiently input to the photoelectric conversion element panel.

When the moisture-resistant protection film is provided on the entire outer circumference of the scintillator panel, from the same viewpoint, preferably, the moisture-resistant protection film surface provided on the scintillator layer is directly attached to the planar light receiving element surface of the photoelectric conversion element panel.

The scintillator panel is as already described above.

Photoelectric Conversion Element Panel

The photoelectric conversion element panel included in the radiation detector according to the present embodiment of the invention serves to absorb emission light generated in the scintillator layer to convert the light into a form of electric charge, then into an electrical signal, and output information included in the emission light as the electrical signal to an outside of the radiation detector. The photoelectric conversion element panel is not particularly limited as long as the panel can perform such a function, and can be a conventionally known one.

The photoelectric conversion element panel is formed by incorporating a photoelectric conversion element in a panel. The structure of the photoelectric conversion element panel is not particularly limited. Usually, a substrate for a photoelectric conversion element panel, an image signal output layer, and a photoelectric conversion element are laminated together in this order.

The photoelectric conversion element may have any specific structure as long as the element serves to absorb light generated in the scintillator layer to convert the light into a form of electric charge. For example, the photoelectric conversion element can be formed by a transparent electrode, an electric charge generation layer that generates electric charge by being excited by input light, and a counter electrode. The transparent electrode, the electric charge generation layer, and the counter electrode all can be conventionally known ones. Additionally, the photoelectric conversion element may be formed by an appropriate photo sensor. For example, the photoelectric conversion element may be formed by a plurality of two-dimensionally arranged photodiodes or formed by a two-dimensional photo sensor, such as a charge coupled device (CCD) or a complementary metal-oxide-semiconductor (CMOS) sensor.

In addition, the image signal output layer serves to accumulate electric charge obtained by the photoelectric conversion element and perform output of a signal based on the accumulated electric charge. The image signal output layer may have any structure as long as the layer has such a function. For example, the image signal output layer can be formed using a capacitor as an electric charge accumulation element that accumulates electric charge generated by the photoelectric conversion element in each pixel and a transistor as an image signal output element that outputs the accumulated electric charge as a signal. Herein, an example of a preferable transistor is a thin film transistor (TFT).

Additionally, the substrate serves as a support body of the photoelectric conversion element panel and can be the same as the support body used in the scintillator panel according to the embodiment of the invention described above.

Accordingly, the photoelectric conversion element panel usable in the present embodiment can be any of those having various structures. For example, as used in Examples to be described later, there can be used a photoelectric conversion element panel in which a plurality of photodiodes and a plurality of TFT elements are formed on a glass substrate.

Furthermore, the photoelectric conversion element panel can further include various components that can be included in a photoelectric conversion element panel forming a known radiation detector, such as a memory unit for storing an image signal based on intensity information and position information of a radiation such as X-ray converted into an electrical signal, a power supply unit for supplying power necessary to drive the photoelectric conversion element panel 20, and a communication output unit for extracting image information to the outside.

FIG. 2 shows an example of the first radiation detector. As shown in FIG. 2, in the first radiation detector 30, the scintillator panel 10 and the photoelectric conversion element panel 20 are combined together to allow an X-ray entering from the outside to be converted into light in the scintillator layer 12 forming the scintillator panel 10 and allow the light to be converted into an electrical signal by the photoelectric conversion element forming the photoelectric conversion element panel 20. As used herein, in FIG. 2, the thick arrow indicates an exemplary input direction of a radiation such as X-ray.

In order to perform such a conversion efficiently, the first radiation detector 30 is preferably formed by combining the scintillator panel 10 with the photoelectric conversion element panel 20 in such a manner that the scintillator layer 12 forming the scintillator panel 10 faces the photoelectric conversion element (not shown) forming the photoelectric conversion element panel 20. Herein, more preferably, a scintillator panel including a reflecting layer 13 provided between the support body 11 and the scintillator layer 12 is employed as the scintillator panel 10, since the reflecting layer 13 can guide even light traveling in an opposite side to the photoelectric conversion element panel 20 among emission light from the scintillator layer 12, to the photoelectric conversion element panel 20.

(Second Radiation Detector)

A second radiation detector according to an embodiment of the invention includes a photoelectric conversion element panel and a scintillator layer formed on the photoelectric conversion element panel. The scintillator layer includes a phosphor comprising columnar crystals. Roots of the plurality of columnar crystals positioned on a columnar crystal growth starting surface of the scintillator layer exist independently from each other. In the scintillator layer, a thickness region from the columnar crystal growth starting surface up to a height of 5 μm has a radiation absorptivity x of from 5.4 to 8.6%.

The second radiation detector according to the embodiment of the invention is a so-called "directly vapor-deposited FPD" in which the scintillator layer is directly provided on the photoelectric conversion element panel, and does not need a support body to be included in the scintillator panel, which is equivalent to the support body in the first radiation detector according to the embodiment. In the "directly vapor-deposited FPD", the photoelectric conversion element panel and the scintillator layer cannot be detached from each other. When an intermediate resin layer to be described later is provided on the photoelectric conversion element panel, the scintillator layer may be directly provided on the intermediate resin layer provided thereon.

Figure 1B:
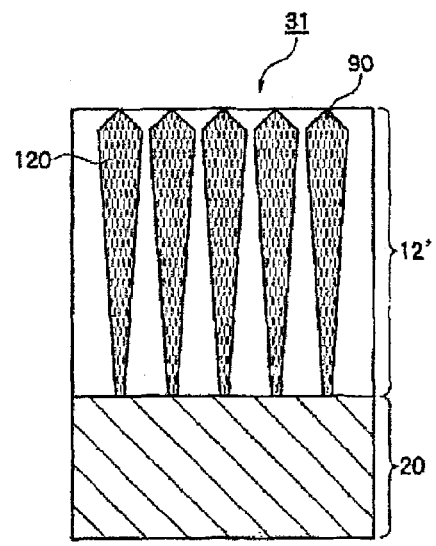
FIGS. 1B is another schematic diagram showing exemplary structures of a scintillator panel and a radiation detector according to embodiments of the present invention, the diagrams being sectional views of surfaces parallel to thickness directions of the scintillator panel and the radiation detector.

FIG. 1B shows an example of a basic structure of the second radiation detector according to the embodiment of the invention.

The second radiation detector is the same as the first radiation detector according to the embodiment in that the detector includes a scintillator layer and a photoelectric conversion element panel and, if necessary, further includes a reflecting layer, a light shielding layer, and a pigment layer. In addition, while the scintillator layer, the photoelectric conversion element panel, the reflecting layer, the light shielding layer, and the pigment layer themselves are also the same as those in the first radiation detector. However, the second radiation detector is different from the first radiation detector in that the scintillator layer is not formed on the support body (FIG. 1A) but on the photoelectric conversion element panel (FIG. 1B). Additionally, in the second radiation detector, positions for forming the reflecting layer, the light shielding layer, and the pigment layer are also different from those in the first radiation detector according to the embodiment of the invention. Those layers are formed not between the support body and the scintillator layer and not on a surface of the support body on the side where the scintillator layer is not located, but between the scintillator layer and the photoelectric conversion element panel or on a columnar crystal growth ending surface of the scintillator layer (the surface of a side where the photoelectric conversion element panel is not located).

Intermediate Resin Layer

The second radiation detector according to the embodiment of the invention may include an intermediate resin layer between the photoelectric conversion element panel and the scintillator layer in order to prevent contamination of the photoelectric conversion element panel due to a scintillator layer-derived component. The intermediate resin layer serves as a protection layer for the photoelectric conversion element panel.

The resin included in the intermediate resin layer is preferably a polymer having a glass transition temperature of from 30 to 100° C.

Specific examples of the resin included in the intermediate resin layer include the same resins as those exemplified as the binder resin forming the reflecting layer. Among the resins, particularly preferred are polyester resins. In addition, the resin included in the intermediate resin layer may be a single resin or a mixture of two or more resins, as with the binder resin forming the reflecting layer.

Additionally, the intermediate resin layer may be a polyparaxylylene film or the like formed, for example, by vapor deposition.

The intermediate resin layer has a film thickness of preferably 0.1 μm or more from the viewpoint of film adhesion between the columnar crystals of the phosphor of the scintillator layer and the photoelectric conversion element panel, and preferably 3.0 μm or more and more preferably 0.2 to 2.5 μm from the viewpoint of securing the surface smoothness of the intermediate resin layer.

Moisture-Resistant Protection Film

In the first and second radiation detectors according to the embodiments of the invention, preferably, a moisture-resistant protection film is provided in such a manner that covers entire outer circumferences of the radiation detectors.

From the viewpoint of cost and the like, in the first and second radiation detectors according to the embodiments of the invention, preferably, a moisture-resistant protection film is provided in such a manner that covers only an entire surface of the scintillator layer not in contact with a layer other than the scintillator layer.

The moisture-resistant protection film serves to provide moisture proofness to the entire panel or the entire surface of the scintillator layer not in contact with the layer other than the scintillator layer to suppress deterioration of the scintillator layer.

A material, a film thickness, and the like for forming the moisture-resistant protection film are the same as those for forming the moisture-resistant protection film in the scintillator panel.

[Method for Manufacturing Scintillator Panel]

A method for manufacturing a scintillator panel according to an embodiment of the invention is not particularly limited as long as the object of the invention is not impaired. For example, based on a conventionally known method for manufacturing a scintillator panel, conditions such as vapor deposition conditions may be set so that a plurality of columnar crystals in a scintillator layer are independent from each other and the radiation absorptivity of a specific region of the scintillator layer is within a specific range.

Specifically, the scintillator panel can be manufactured, for example, by forming a reflecting layer and a reflecting layer protection layer on a support body as needed, then forming a scintillator layer and, furthermore, forming a moisture-resistant protection film as needed, so as to cover the entire outer circumference or the like of the obtained laminated body.

Formation of Scintillator Layer

Herein, a specific method for forming a scintillator layer is not particularly limited as long as the method can form a phosphor forming the scintillator layer into a shape of columnar crystals, allows the columnar crystals to be formed so that roots of the columnar crystals can exist independently from each other, and can control the radiation absorptivity of a specific region of the scintillator layer to be within a specific range. The scintillator layer is preferably formed by a gas phase deposition process, particularly, vapor deposition.

An apparatus for vapor deposition is not particularly limited. For example, the apparatus therefor is preferably a vapor deposition apparatus 40, as shown in FIG. 4 or 5.

Figure 4:
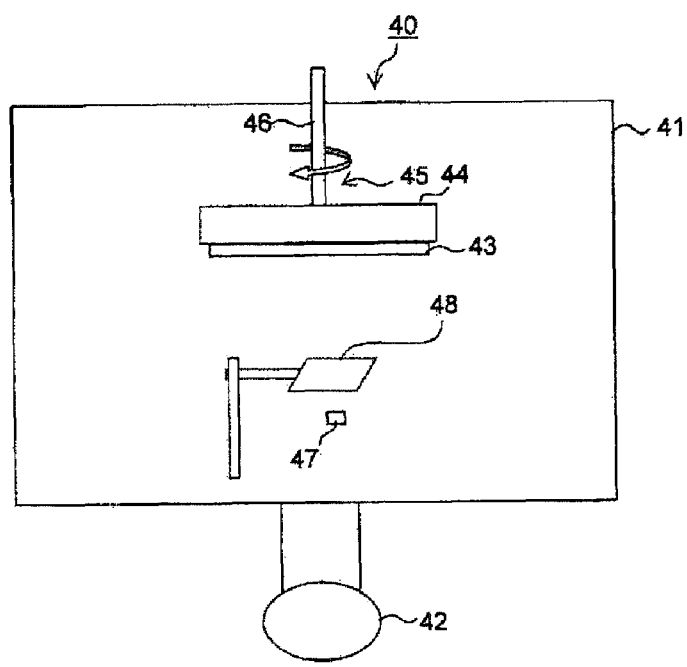
FIG. 4 is a schematic diagram showing one structure of an exemplary vapor deposition apparatus for use in the invention.
Figure 5:
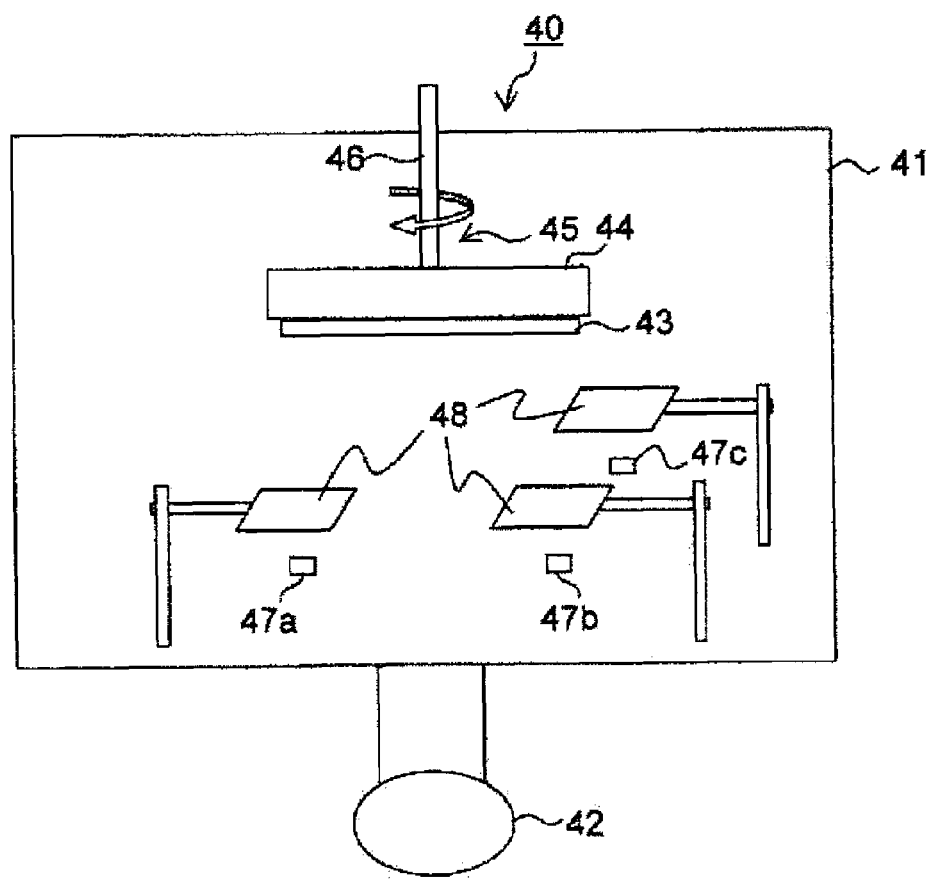
FIG. 5 is a schematic diagram showing another structure of the exemplary vapor deposition apparatus for use in the invention, which is different from the structure of FIG. 4.

As shown in FIG. 4 or 5, the vapor deposition apparatus 40 includes a box-shaped vacuum vessel 41, and a vapor deposition source 47 is disposed in the vacuum vessel 41. The vacuum deposition source 47 is placed in a heater-equipped container and adapted to be heated and evaporated by operation of the heater. The vapor deposition source 47 is, for example, a phosphor matrix compound or a mixture including a phosphor matrix compound and an activator. Herein, the vapor deposition source 47 may be provided in plurality, as shown in FIG. 5, and the number of the vapor deposition source 47 may be changed according to the kind, number, and the like of the raw material for forming the scintillator layer. The same shall also apply to a shutter 48. The vapor deposition apparatus 40 shown in FIG. 5 is an example of a vapor deposition apparatus that includes three vapor deposition sources 47a, 47b, and 47c as the vapor deposition source 47.

The vapor deposition source 47 including an activator is preferably filled in a container different from a container in which the vapor deposition source 47 including no activator is filled. In such a mode, by individually adjusting a temperature for heating the vapor deposition source 47 including an activator or adjusting the opening degree of the shutter 48 provided for the vapor deposition source 47 including an activator, the relative activator content can be controlled with higher accuracy for each optional position of the columnar crystals, particularly for each position thereof in the thickness direction of the scintillator layer.

Examples of the heater-equipped container include a resistance heating crucible. Herein, the material for forming the container may be a ceramic such as alumina or a metal having a high melting point, such as tantalum or molybdenum.

A holder 44 for holding a vapor deposition substrate 43 is disposed right above the vapor deposition source 47 in the vacuum vessel 41. Herein, the vapor deposition substrate 43 may be a support body itself on which any other layer such as a reflecting layer or a protection layer is not laminated on the support body or may be a laminated body obtained by forming a reflecting layer, a light shielding layer, a pigment layer, a reflecting layer protection layer, and the like on a support body.

The holder 44 is provided with a heater (not shown), and the heater is adapted to be operated to heat the vapor deposition substrate 43 fitted into the holder 44. In heating the vapor deposition substrate 43, the temperature of the vapor deposition substrate 43 is controlled within an appropriate range, whereby a substance adhering to a surface of the deposition substrate 43 before vapor depositing the phosphor matrix compound and the like to form a scintillator layer can be detached and removed; formation of an impurity layer between the surface and the scintillator layer formed thereon can be prevented; adhesion therebetween can be reinforced; and film quality of the scintillator layer to be formed on the surface can be adjusted.

A rotation mechanism 45 for rotating the holder 44 is disposed on the holder 44. The rotation mechanism 45 includes a rotation shaft 46 connected to the holder 44 and a motor (not shown) serving as a drive source. When the motor is driven, the rotation shaft 46 rotates to allow the holder 44 to be rotated while facing the vapor deposition source 47.

In the vapor deposition apparatus 40, in addition to the above components, a vacuum pump 42 is disposed on the vacuum vessel 41. The vacuum pump 42 exhausts the vacuum vessel 41 and introduces gas thereinto. With operation of the vacuum. pump 42, the inside of the vacuum vessel 41 can be maintained in a gas atmosphere with a constant pressure.

The scintillator layer can be formed as follows: a vapor deposition source such as a phosphor matrix compound is filled in the heater-equipped container; the inside of the apparatus is exhausted and simultaneously an inert gas such as argon is introduced thereinto from an inlet port to keep the inside thereof under a reduced pressure environment with a pressure of preferably approximately $10^{-3}$ to 1 Pa (an absolute pressure); and, the vapor deposition source such as the phosphor matrix compound is heated and evaporated to deposit a phosphor crystal deposit on the surface of the vapor deposition substrate 43 as a support body laminated with a reflecting layer, a reflecting layer protection layer, and the like as needed. Herein, the vapor deposition rate is preferably from 5 to 200 nm/s from the viewpoints of setting the radiation absorptivity to be within a predetermined range, eventually improving sharpness of a radiation image to be obtained, and the like. Additionally, in forming crystals made of a mixture of a phosphor matrix compound and an activator, vapor deposition can be performed using the vapor deposition apparatus 40 as shown in FIG. 5 by filling the phosphor matrix compound in a first heater-equipped container and filling the activator in a second heater-equipped container respectively, as the vapor deposition sources 47a and 47b respectively.

In addition, a scintillator layer including two or more layers including a base layer can be formed as follows. A phosphor matrix compound for forming the base layer, an activator for forming the base layer used if necessary, a phosphor matrix compound for forming a layer other than the base layer, and an activator for forming the layer other than the base layer are filled individually or in combination as appropriate in respectively separate heater-equipped containers, and amounts of the respective filled vapor deposition sources are added or reduced. Additionally/alternatively while individually opening or closing the shutter 48 for each vapor deposition source, vapor deposition is performed to form the scintillator layer.

Each of roots of the columnar crystals can be made into an independent shape by changing the material of the raw material serving as a deposition surface or changing the surface energy of the deposition surface by plasma processing.

A radiation absorptivity x and a radiation absorptivity y of the scintillator layer formed on the vapor deposition substrate 43 and a ratio (x/y) of the radiation absorptivity x to the radiation absorptivity y can be controlled by appropriately changing and adjusting respective conditions in vapor deposition and the surface energy of the vapor deposition surface within predetermined ranges.

Specifically, the control will be made as follows.

Whether the roots of crystals to be formed on the deposition surface become columnar or not and become independent from each other are influenced, for example, by the surface energy of the deposition surface. In addition, from the viewpoint of forming columnar crystals whose roots are columnar and independent from each other, the surface energy of the deposition surface is preferably from 20 to 65 mJ/m².

In addition, the crystal diameter of the columnar crystals to be formed on the deposition substrate 43 can be controlled by changing the temperature of the deposition substrate 43. As the temperature of the deposition substrate 43 is increased, the crystal diameter can be enlarged. Accordingly, in order to form columnar crystals with roots independent from each other, it is necessary to lower the temperature at the start of vapor deposition of the deposition substrate 43 on which a scintillator layer is to be formed. Specifically, the temperature is preferably set to be from 5 to 320° C. Additionally, in order to appropriately make small a ratio (b/a) of an average crystal diameter "b" of the columnar crystals at a position of a height of 3 μm to an average crystal diameter "a" of the columnar crystals at a position of a height of 1 μm, the temperature increase rate on the deposition substrate 43 at an initial stage of vapor deposition is preferably appropriately made small. For example, the temperature increase rate on the deposition substrate 43 is preferably controlled so that a difference between the temperature of the deposition substrate 43 at the start of vapor deposition and a temperature thereof up to a point in time when an amount of the phosphor corresponding to a root portion of up to 3 μm is deposited on the deposition substrate 43 (up to a point in time when the height of the columnar crystals reaches 3 μm) is within a range of up to 100° C. When considering the height of the columnar crystals, the phrase "at the start of vapor deposition" means a point in time when the height of the columnar crystals is 0 μm, and the phrase up to a point in time when an amount of the phosphor corresponding to a root portion of up to 3 μm is deposited on the deposition substrate 43" means "up to a point in time when the height of the columnar crystals reaches 3 μm". Then, during the period of time up to ending of the vapor deposition, the temperature of the deposition substrate 43 is preferably maintained at from 150 to 320° C. When the temperature increase rate on the deposition substrate 43 at the initial stage of vapor deposition is set to be excessively high, the crystal diameter of the columnar crystals may discontinuously change in a region of the scintillator layer. However, even when such a region occurs, the scintillator panel of the embodiment of the invention can work as a scintillator panel.

In the mode where the scintillator layer includes two or more layers including abase layer, the film thickness of the base layer can be controlled to be within the preferable range described in the above section of "Scintillator Layer" by performing vapor deposition by adjusting the amount of the phosphor matrix compound or the like to be filled in a heater-equipped container for base-layer deposition, such as a resistance crucible, or opening and closing timings for the shutters 48 and opening and closing times therefor. Herein, in manufacturing a radiation detector that can provide radiation images such as X-ray images having higher brightness and higher sharpness by forming a scintillator layer including columnar crystals with roots independent from each other, the temperature of the deposition substrate 43 during the formation of the base layer is set to be preferably from 5 to 320° C., and more preferably from 15 to 50° C. Particularly preferably, the temperature of the deposition substrate 43 is set to be approximately from 15° C. to room temperature (usually 25° C.) without heating the deposition substrate 43.

In addition, any layer other than the base layer is formed by filling a mixture of a phosphor matrix compound and an activator into a heater-equipped container or filling the phosphor matrix compound and the activator, respectively, into separate heat-equipped containers and depositing a crystal deposit on the base layer by applying the same conditions and method for vapor deposition as those above. Adjustments to the film thickness of the any layer other than the base layer can be made by adjustments to an amount of the phosphor matrix compound (and an amount of the activator) to be filled in the heater-equipped containers for forming the any layer other than the base layer or opening and closing timings for the shutters 48 and opening and closing times therefor.

Formation of Reflecting Layer

A reflecting layer can be formed by directly attaching a reflecting-layer raw material onto a desired layer, for example, onto the support body by vacuum deposition, sputter deposition, or plating. Preferred is sputter deposition from the viewpoint of productivity.

Formation of Light Shielding Layer

A method for covering the entire one main surface of the support body with a light shielding layer is not particularly limited. Examples of the method therefor include a method of forming a light shielding layer on the entire one main surface of the support body by vapor deposition or sputtering and a method of attaching a light shielding layer as a metal foil to the entire one main surface of the support body. From the viewpoint of adhesion of the light shielding layer to the support body, most preferred is the method of forming a light shielding layer onto the one main surface of the support body by sputtering.

Formation of Pigment Layer

As a method for covering the entire one main surface of the support body with a pigment layer, there can be used a method of coating and drying a pigment layer-forming coat liquid that includes any of the pigments mentioned above, a solvent, and the like on the entire one main surface of the support body to form a pigment layer.

Formation of Reflecting Layer Protection Layer

A reflecting layer protection layer is formed preferably by coating and drying a coat liquid obtained by dissolving resin and the like as a raw material for the reflecting layer protection layer in a solvent from the viewpoints of improving adhesion of the reflecting layer protection layer to the reflecting layer and the columnar crystals of the scintillator layer and improving productivity of the scintillator panel. The resin to be dissolved in the solvent is preferably a polymer having a glass transition temperature of from 30 to 100° C. as described in the section of "Reflecting Layer", in terms of film adhesion of the reflecting layer protection layer to the reflecting layer and the columnar crystals of the scintillator layer.

Examples of a solvent to be used in the coat liquid for forming the reflecting layer protection layer include lower alcohols such as methanol, ethanol, n-propanol, and n-butanol; chlorine atom-containing hydrocarbons such as methylene chloride and ethylene chloride; ketones such as acetone, methyl ethyl ketone, and methyl isobutyl ketone; aromatic compounds such as toluene, benzene, cyclohexane, cyclohexanone, and xylene; esters of lower fatty acids and lower alcohols, such as methyl acetate, ethyl acetate, and butyl acetate; ethers such as dioxane, ethylene glycol monoethyl ester, and ethylene glycol monomethyl ether; and mixtures of any thereof.

Formation of Moisture-Resistant Protection Film

A moisture-resistant protection film may be formed on a predetermined region of the scintillator panel according to a conventionally known method.

When the moisture-resistant protection film is a heat seal layer, for example, each of resin films for the heat seal layer are disposed on and under an unsealed scintillator panel to sandwich the scintillator panel therebetween, and then contacted ends of the top and bottom resin films are fused in a reduced pressure atmosphere to seal the panel, whereby a moisture-resistant protection film can be formed on the entire outer circumference of the scintillator panel.

In addition, when using a moisture-resistant film of polyparaxylylene or the like as a moisture-resistant protection film, the scintillator panel including the support body with the scintillator layer formed thereon is placed in the vapor deposition chamber of a CVD (chemical vapor deposition) device and left exposed in a vapor in which diparaxylylene is sublimed, thereby obtaining a scintillator panel whose entire outer circumference is covered with a polyparaxylylene film.

Method for Manufacturing First Radiation Detector

A method for manufacturing a first radiation detector according to an embodiment of the present invention is not particularly limited as long as the object of the invention is not impaired. Basically, the manufacturing method therefor can be the same as conventionally known methods for manufacturing a radiation detector.

For example, the first radiation detector according to the embodiment of the invention can be obtained by coupling the above-described scintillator panel with a photoelectric conversion element panel.

The surface of the scintillator panel to be coupled is an outermost surface layer thereof on a scintillator layer side opposite to the support body. Depending on the structure of the scintillator panel, the surface thereof to be coupled may be a surface of the scintillator layer or a surface of the moisture-resistant protection film provided on the scintillator layer.

The photoelectric conversion element panel and the scintillator layer may be coupled with each other via an intermediate resin layer.

Hereinafter, a description will be given of an example in which the surface of the scintillator panel to be coupled is the surface of the scintillator layer, and the surface of the scintillator layer will be coupled with a surface of the photoelectric conversion element panel.

In coupling the scintillator panel with the photoelectric conversion element panel, it is preferable to select a coupling method that suppresses light scattering on the coupled surfaces thereof. Suppression of light scattering on the coupled surfaces can suppress deterioration in sharpness of a radiation image to be obtained. Examples of such a coupling method include a method of tightly attaching the scintillator layer surface of the scintillator panel to the surface of the photoelectric conversion element panel by any pressurizing means and a coupling method using a coupling agent having a refractive index as an intermediate value between a refractive index value of the scintillator layer of the scintillator panel and a refractive index value of a light receiving element of the photoelectric conversion element panel.

Examples of the coupling agent for coupling the scintillator layer surface of the scintillator panel with the surface of the photoelectric conversion element panel include adhesives, optical grease, and optical oils having adhesiveness to the scintillator panel and the photoelectric conversion element panel.

Examples of the adhesives include room temperature vulcanizing type (RTV-type) adhesives such as acrylic adhesives, epoxy-based adhesives, and silicon-based adhesives and rubber-based adhesives including elastic adhesive resins.

The acrylic adhesives may be adhesives including acrylic polymers containing a silicon component pendant to the main chain or a side chain thereof.

Examples of the silicon adhesives include peroxide cross-linking type and addition condensation type silicon adhesives. These adhesives may be used singularly or in combination.

Examples of the rubber-based adhesives include synthetic rubber-based adhesives including block copolymers such as styrene-isoprene-styrene and homopolymers such as polybutadiene and polybutylene and natural rubber-based adhesives. Suitable examples of commercially available rubber-based adhesives include a single liquid-type RTV rubber KE420 (manufactured by Shin-Etsu Chemical Co., Ltd).

The adhesives may be used singularly or in combination of two or more thereof. For example, an acrylic adhesive and a rubber-based adhesive may be used in combination.

An optical oil usable can be any of publicly known ones including commercially available products as long as the oil is highly transparent and adhesive. Suitable examples of the publicly known ones include KF96H (one million CS: manufactured by Shin-Etsu Chemical Co., Ltd.) and Cargille Immersion Oil Type 37 (refractive liquid: manufactured by Cargille Laboratories, Inc).

When the scintillator panel and the photoelectric conversion element panel are attached together with an adhesive, the scintillator panel, the adhesive, and the photoelectric conversion element panel are laminated together usually in this order. Then, a pressure of from 10 to 500 $g/cm^2$ is applied to the obtained laminated body from a direction perpendicular to a main surface of the laminated body until the adhesive is solidified. The pressurization removes air bubbles from the adhesive layer. When a hot-melt resin is used as the adhesive, the laminated body is heated up to a temperature of 10° C. or higher than a melting start temperature of the hot-melt resin while applying a pressure of from 10 to 500 $g/cm^2$ from the direction perpendicular to the main surface of the laminated body. After that, the laminated body is allowed to standstill for 1 to 2 hours and then gradually cooled down. Rapid cooling tends to cause damage to the light receiving element included in the photoelectric conversion element panel due to contraction stress of the hot-melt resin. Preferably, the laminated body is cooled down to 50° C. or lower at a rate of 20° C./hour.

In addition, the problem with deterioration in the sharpness of radiation images due to light scattering on the coupled surfaces of the scintillator panel and the photoelectric conversion element panel can also be solved by performing scattering prevention processing on the scintillator layer surface of the scintillator panel and the light receiving element surface of the photoelectric conversion element panel. The scattering prevention processing can be performed, for example, by providing a light scattering prevention layer on the scintillator layer surface of the scintillator panel, providing a reflection prevention layer on at least one of the scintillator layer surface of the scintillator panel or the light receiving element surface of the photoelectric conversion element panel, or allowing any one or both of the scintillator layer surface and the light receiving element surface of the photoelectric conversion element panel facing each other to have a surface roughness (Ra) of from 0.5 to 5.0 μm.

In addition, combining the scattering prevention processing with any of the already known coupling methods described above can more effectively prevent light scattering on the coupled surfaces, so that there can be obtained radiation images having higher sharpness and higher uniformity.

Herein, the light scattering prevention layer has a light transmittance of from 60 to 99% with respect to light with a wavelength of 550 nm and serves to attenuate the intensity of emission light that propagates along a long optical path in the light scattering prevention layer. Emission light that directly travels to the light receiving element of the photoelectric conversion element panel from a light emission position in the scintillator layer of the scintillator panel propagates along a short optical path in the light scattering prevention layer. Accordingly, the intensity thereof is hardly reduced in the light scattering prevention layer. Scattering light or the like that travels at an angle nearly parallel with the light receiving element surface in the light scattering prevention layer propagates along a long optical path and therefore is effectively removed in the light scattering prevention layer. The light scattering prevention layer also serves as the moisture-resistant protection film or reflecting layer protection layer described above according to the position thereof to be provided.

The light scattering prevention layer is, for example, a resin layer. Examples of resin included in the resin layer include the same resins as those exemplified as the binder resin forming the reflecting layer. The resin included in the light scattering prevention layer may be a single resin or a mixture of two or more resins, as with the binder resin forming the reflecting layer. Additionally, the light scattering prevention layer may be a layer formed of a polyparaxylylene film formed by a CVD process (a chemical vapor deposition process). A light scattering prevention layer formed of such a polyparaxylylene film is particularly preferable from viewpoints such as that the layer can be easily formed on the scintillator layer of the scintillator panel or the light receiving element surface and that the layer serves also as a moisture-resistant protection film and a reflecting layer protection layer. In this case, since the polyparaxylylene film serves not only as the light scattering prevention layer but also as the moisture-resistant protection film and the reflecting layer protection layer, it is not always necessary to additionally provide a moisture-resistant protection film and a reflecting layer protection layer. In addition, the polyparaxylylene film serves also as a reflection prevention layer.

When making adjustments to the light transmittance of the light scattering prevention layer by including a coloring material in the light scattering prevention layer, a blue colorant is preferable as the coloring material from the viewpoint of absorbing red long-wave light that more easily scatters among light with various wavelengths. Examples of the blue colorant include the same pigments as those exemplified as the blue pigment of the pigment layer.

The reflection prevention layer prevents reflection of emission light generated in the scintillator layer of the scintillator panel, thereby preventing a phenomenon in which the emission light is repeatedly reflected between the scintillator layer surface of the scintillator panel and the light receiving element surface of the photoelectric conversion element panel and propagates therebetween, and eventually preventing the emission light from being erroneously detected in a pixel region of a light receiving element unit in a position away from the light emission position. The reflection prevention layer, when provided on the scintillator layer surface, is a resin layer having a smaller refractive index than that of the scintillator layer. On the other hand, when provided on the light receiving element surface, the reflection prevention layer is a resin layer having a smaller refractive index than that of the light receiving element. Examples of resin included in the resin layer as the reflection prevention layer include the same resins as those exemplified as the binder resin forming the reflecting layer. The resin included in the light scattering prevention layer may be a single resin or a mixture of two or more resins, as with the binder resin forming the reflecting layer. Additionally, the reflection prevention layer is preferably a layer formed of a polyparaxylylene film formed by a CVD process (a chemical vapor deposition process) from the same viewpoints as those described in the mode in which the light scattering prevention layer is a layer formed of a polyparaxylylene film formed by a CVD process (a chemical vapor deposition process).

The reflection prevention layer is preferably designed to have a light transmittance of 60 to 99% with respect to light with a wavelength of 550 nm from the viewpoint of allowing the reflection prevention layer to serve also as the light scattering prevention layer.

By allowing any one or both of the scintillator layer surface and the light receiving element surface of the photoelectric conversion element panel facing each other to have a surface roughness of from 0.5 to 5.0 μm, regular reflection and total reflection of light due to roughness of a light input surface can be suppressed. This can effectively prevent emission light generated in the scintillator layer from being scattered between the scintillator layer surface and the light receiving element surface. As used herein, the term "surface roughness" means "arithmetic average roughness (Ra)".

In addition, more preferably, each of the light scattering prevention layer and the reflection prevention layer provided on the scintillator layer or on the photoelectric conversion element panel also has an arithmetic average roughness of from 0.5 to 5.0 μm on a face (a surface) thereof contacted with the scintillator panel surface or the photoelectric conversion element panel surface from the viewpoint of obtaining a combined effect associated with the light scattering prevention described above.

Method for Manufacturing Second Radiation Detector

A method for manufacturing a second radiation detector according to an embodiment of the present invention is the same as the method for manufacturing a first radiation detector in terms of using the same scintillator layer, reflecting layer, light shielding layer, pigment layer, and photoelectric conversion element panel, and forming methods therefor, and the like. However, unlike the method for manufacturing a first radiation detector, the scintillator layer is formed not on the support body but on the photoelectric conversion element panel. In addition, positions for forming the reflecting layer, the light shielding layer, and the pigment layer in the method for manufacturing a second radiation detector according to the embodiment of the invention are also different from those in the method for manufacturing a first radiation detector according to the embodiment of the invention, and are not between the support body and the scintillator layer and not on the surface of the support body on the side where the scintillator layer is not located, but on a surface of the scintillator layer on a side where the photoelectric conversion element panel is not located.

When a scintillator layer forming a second radiation detector is formed by the vapor deposition apparatus as shown in FIG. 4 or 5, the photoelectric conversion element panel may be used as a deposition substrate, and vapor deposition may be performed, as a deposition surface, on a surface of the photoelectric conversion element panel on which a photoelectric conversion element is formed, among surfaces thereof.

In this case, in order to prevent the photoelectric conversion element panel from being damaged due to heating, there may be employed a method of maintaining a temperature of a side of the panel where a scintillator layer 12' is to be formed at from 150 to 320° C., while cooling the photoelectric conversion element panel 20 in a state in which a side thereof where the scintillator layer 12' is not to be formed is fixed to the holder 44. Herein, there is no particular limitation on any specific means for cooling the photoelectric conversion element panel 20. The photoelectric conversion element panel 20 can be cooled, for example, by allowing water or a coolant to flow in a pipe (omitted in the drawings) provided in the holder 44 and/or using a Peltier device or the like.

The intermediate resin layer is preferably formed by coating and drying a coat liquid prepared by dissolving a resin in a solvent.

The solvent to be used in the coat liquid for forming the intermediate layer may be any of the same ones as those to be used to form the reflecting layer protection layer, described in the section of "Method for Manufacturing Scintillator Panel".

In addition, the intermediate resin layer may be formed by forming a film of, for example, polyparaxylylene or the like on the photoelectric conversion element panel by using a CVD apparatus or the like.

EXAMPLES

The present invention will be described in more detail by way of the following Examples. The invention is not limited to the description of the Examples below without departing from the gist thereof.

Example 1

(Support Body)

As the support body, there was employed a support body made of a polyimide film (UPILEX-1255 manufactured by Ube Industries, Ltd.) with a thickness of 125 µm. Additionally, Al was deposited with a thickness of 100 nm on the support body by a sputtering device to form a reflecting layer. Furthermore, a silicon resin was laminated on the reflecting layer on the support body to obtain a support body with the reflecting layer and the reflecting layer protection layer formed thereon (a layer structure: support body/reflecting layer/reflecting layer protection layer; hereinafter referred to as "deposition substrate A"). The reflecting layer protection layer had a surface energy of 20 mJ/m$^2$.

The surface energy of the deposition substrate A was measured according to a contact angle method (a liquid droplet method). Specifically, the deposition substrate A was disposed on a flat plane; next, a plurality of wetting tension test mixture liquids having different wetting tensions were prepared; and each of the wetting tension test mixture liquids was dropped onto the deposition substrate A to measure a time during which each wetting tension test mixture liquid was able to wet the surface of the deposition substrate A. Then, among wetting tension test mixture liquids capable of wetting the surface of the deposition substrate A for at least two seconds, a wetting tension of a wetting tension test mixture liquid having a minimum wetting tension was assumed to be a surface energy of the deposition substrate A.

(Formation of Scintillator Layer)

In Example 1, as shown below, there was used the vapor deposition apparatus 40 shown in FIG. 5. CsI as a phosphor matrix compound was filled in two crucibles (first and second resistance heating crucibles), and control was made so that CsI continued to evaporate from the first and second resistance heating crucibles from the start of vapor deposition to the end thereof, whereby a base layer and a portion forming a scintillator layer except for the base layer were formed in this order on the reflecting layer protection layer of the deposition substrate A, thereby forming a scintillator layer composed of two layers on one surface of the support body. Specifically, the process is as follows.

First, CsI as the phosphor matrix compound was filled in the first and second resistance heating crucibles, and TlI as an activator was filled in a third resistance heating crucible. The respective contents were designated as deposition sources 47a, 47b, and 47c, respectively. Additionally, as the deposition substrate 43, the deposition substrate A was disposed on the holder 44, and a distance between the deposition substrate 43 and the deposition source 47a, a distance between the deposition substrate 43 and the deposition source 47b, and a distance between the deposition substrate 43 and the deposition source 47c, respectively, were adjusted to 400 mm.

Next, air in the vacuum vessel 41 of the vapor deposition apparatus 40 was exhausted once through the vacuum pump 42. After finishing exhausting, Ar gas was introduced into the vacuum vessel 41 to adjust a degree of vacuum in the vacuum vessel 41 of the vapor deposition apparatus 40 to 0.5 Pa (an absolute pressure). Then, the deposition substrate 43 was rotated together with the holder 44 at a rate of 10 rpm.

Next, the deposition substrate 43 was heated, and when the temperature of the deposition substrate 43 reached 50° C., the first resistance heating crucible was heated to start vapor deposition. The phosphor matrix compound was deposited on a surface of the deposition substrate on which a scintillator layer was intended to be formed, whereby, of the portions forming the scintillator layer, a base layer made of columnar crystals was formed with a thickness of 10 µm.

After forming the base layer in this manner, the temperature of the deposition substrate 43 was set to 190° C. and heating of the second and third resistance heating crucibles was started, thereby also obtaining the portion forming the scintillator layer other than the base layer. In this case, the temperature for forming the third resistance heating crucible was controlled to adjust a vapor deposition rate of the activator so that the entire scintillator layer had an activator concentration of 0.4 mol %, thereby controlling the activator concentration of the entire scintillator layer.

When the film thickness of the scintillator reached 400 µm, vapor deposition was ended to obtain a scintillator panel including a scintillator layer having a predetermined film thickness on the surface of the deposition substrate 43 on which a scintillator layer was intended to be formed.

Next, the scintillator panel thus obtained was replaced for a scintillator panel mounted in advance in a separately prepared PaxScan (FPD: 2520 manufactured by Varian Medical Systems, Inc.)

to set in the PaxScan so that an arrangement of "support body of scintillator panel/reflecting layer of scintillator panel/reflecting layer protection layer of scintillator panel/ scintillator layer of scintillator panel/photoelectric conversion element panel of PaxScan" was formed, thereby obtaining a radiation detector. Hereinafter, such a "radiation detector" will be referred to also as "FPD".

The obtained scintillator panel and radiation detector were subjected to various evaluations to be described later. Table 1 shows Results of the evaluations.

Example 2

A scintillator panel and a radiation detector were obtained in the same manner as in Example 1, except that after forming the base layer, the temperature of the deposition substrate 43 was set to 220° C. The obtained scintillator panel and radiation detector were subjected to the various evaluations. Table 1 shows results of the evaluations.

Example 3

A scintillator panel and a radiation detector were obtained in the same manner as in Example 1, except that after forming the base layer, the temperature of the deposition substrate 43 was set to 230° C., and the obtained scintillator panel and radiation detector were subjected to the various evaluations. Table 1 shows results of the evaluations.

Example 4

A scintillator panel and a radiation detector were obtained in the same manner as in Example 1, except that a polyester resin instead of the silicon resin was used as a reflecting layer protection film, and the obtained scintillator panel and radiation detector were subjected to the various evaluations. Table 1 shows results of the evaluations. When the reflecting layer protection film was provided above the support body, the surface energy of the reflecting layer protection layer was 35 mJ/m$^2$.

Example 5

A scintillator panel and a radiation detector were obtained in the same manner as in Example 1, except that polyvinyl butyral instead of the silicon resin was used as a reflecting layer protection film, and the obtained scintillator panel and radiation detector were subjected to the various evaluations. When the reflecting layer protection film was provided above the support body, the surface energy of the reflecting layer protection layer was 65 mJ/m$^2$. Table 1 shows results of the evaluations.

Example 6

A scintillator panel and a radiation detector were obtained in the same manner as in Example 1, except that the same polyvinyl butyral as that in Example 5 instead of the silicon resin was used as a reflecting layer protection film and after forming the base layer, the temperature of the deposition substrate 43 was set to 220° C. as in Example 2. The obtained scintillator panel and radiation detector were subjected to the various evaluations. Table 1 shows results of the evaluations.

Comparative Example 1

A scintillator panel and a radiation detector were obtained in the same manner as in Example 1, except that a fluorine resin instead of the silicon resin was used as a reflecting layer protection film, and the obtained scintillator panel and radiation detector were subjected to the various evaluations. When the reflecting layer protection film was provided above the support body, the surface energy of the reflecting layer protection layer was 15 mJ/m$^2$. Table 1 shows results of the evaluations.

Comparative Example 2

A scintillator panel and a radiation detector were obtained in the same manner as in Example 1, except that the same fluorine resin as that in Comparative Example 1 instead of the silicon resin was used as a reflecting layer protection film and after forming the base layer, the temperature of the deposition substrate 43 was set to 220° C. as in Example 2. The obtained scintillator panel and radiation detector were subjected to the various evaluations. Table 1 shows results of the evaluations.

Comparative Example 3

A scintillator panel and a radiation detector were obtained in the same manner as in Example 1, except that a polyacrylic acid-based resin instead of the silicon resin was used as a reflecting layer protection film, and the obtained scintillator panel and radiation detector were subjected to the various evaluations. When the reflecting layer protection film was provided above the support body, the surface energy of the reflecting layer protection layer was 75 mJ/m$^2$. Table 1 shows results of the evaluations. Comparative Example 4

A scintillator panel and a radiation detector were obtained in the same manner as in Example 1, except that the same polyacrylic acid-based resin as that in Comparative Example 3 instead of the silicon resin was used as a reflecting layer protection film and after forming the base layer, the temperature of the deposition substrate 43 was set to 220° C. as in Example 2. The obtained scintillator panel and radiation detector were subjected to the various evaluations. Table 1 shows results of the evaluations.

Examples 7 to 12 and Comparative Examples 5 to 8

The same methods as the scintillator layer formation methods of Examples 1 to 6 and Comparative Examples 1 to 4 were performed, except that the deposition substrate A was replaced by a photoelectric conversion element panel (hereinafter referred to as "deposition substrate B") with an intermediate resin layer formed thereon, whereby scintillator layers were formed on the deposition substrates B to obtain radiation detectors. The obtained radiation detectors were subjected to the various evaluations. Table 1 shows results of the evaluations.

Examples 7 to 12 and Comparative Examples 5 to 8 were corresponding sequentially to Examples 1 to 6 and Comparative Examples 1 to 4.

In addition, surface energies of the intermediate resin layers of the deposition substrates B in Examples 7 to 12 and Comparative Examples 5 to 8 were sequentially the same as those in Examples 1 to 6 and Comparative Examples 1 to 4. The method for measuring the surface energy of the deposition substrate B is the same as described above, except that the deposition substrate A was replaced by the deposition substrate B.

Herein, the radiation detectors of Examples 1 to 6 correspond to the first radiation detector according to the embodiment of the invention, and the radiation detectors of Examples 7 to 12 correspond to the second radiation detector according to the embodiment of the invention.

[Evaluations of Scintillator Panels and Radiation Detectors]

Measurements and evaluations were performed on the following items in the scintillator panels and the radiation detectors obtained by the respective Examples and Comparative Examples.

(Radiation Absorptivities and Ratios (x/y) in Specific Regions of Scintillator Layers of Scintillator Panels and Radiation Detectors)

Each obtained scintillator panel was embedded with a resin to be described later, and the scintillator layer of the obtained embedded product was polished until it had a predetermined thickness to produce a measurement sample. X-ray was applied to the obtained measurement sample to measure an X-ray absorptivity in a specific region of the scintillator layer of the scintillator panel.

In each of the obtained scintillator panels or radiation detectors, the scintillator layer was detached from the deposition substrate A or B and embedded with a resin. The obtained embedded product (hereinafter referred to as "sample") was polished from the columnar crystal growth ending surface of columnar crystals by using a polishing device. When the film thickness of the sample reached 150 μm, polishing was stopped and then X-ray absorptivity (y) was measured. Next, the sample was further polished from a polished surface side, and when the film thickness thereof reached 5 μm, polishing was stopped and X-ray absorptivity (x) was measured.

(State of Roots of Columnar Crystals)

In each sample before the above polishing, a section parallel to a thickness direction thereof was viewed through a scanning electron microscope (SEM) to observe a state of roots of the columnar crystals. When the columnar crystals had roots independent from each other, the sample was evaluated as "A".

(Brightness of Obtained X-Ray Image)

An X-ray with a tube voltage of 80 kVp was applied to each radiation detector, and an average signal value of obtained image data was used as an amount of light emission to evaluate the brightness of an obtained X-ray image. In Table 1, a brightness of an X-ray image obtained based on an amount of light emission of the radiation detector of Comparative Example 1 was assumed to be 1.0. Then, when the obtained X-ray images had brightnesses of below one time, from one time (equal) to below 1.2 times, from 1.2 times to below 1.3 times, and 1.3 times or more the above brightness value, respectively, the corresponding radiation detectors were evaluated as "D", "C", "B", and "A", respectively.

(Sharpness of Obtained X-Ray Image)

An X-ray having a tube voltage of 80 kVp was applied to a radiation input surface side of each radiation detector through an MTF chart made of lead to detect image data and record it in a hard disk. After that, the record in the hard disk was analyzed by a computer, and a modulation transfer function (MTF) of the X-ray image recorded in the hard disk was regarded as an index of sharpness of the obtained X-ray image. The modulation transfer function (MTF) represents an MTF value at a spatial frequency of 1 cycle/mm. In addition, "MTF" is the abbreviation for "Modulation Transfer Function".

Regarding MTF values In Table 1, an average value (average MTF value) of values measured at nine points in each radiation detector was evaluated. In Table 1, an average MTF of the radiation detector of Comparative Example 1 was assumed to be 1.0. Then, when a radiation detector to be evaluated had an average MTF value of 1.2 times or more than the above value, the sharpness of the X-ray image obtained from the radiation detector to be evaluated was evaluated as "A". Similarly, when the average MTF value was from one time (equal) to below 1.2 times, from 0.8 times to below one time, and below 0.8 times the above value, respectively, the sharpness of the X-ray image was evaluated as "B", "C", and "D", respectively.

(Total Evaluation)

Cases in which results of all the items were equal to or more than conventional levels were evaluated as "B"; those with all "excellent" results were evaluated as "A", and those with results poor than the conventional levels were evaluated as "D".

TABLE 1

| | Deposition target | X-ray absorptivity up to 5 μm (x) | X-ray absorptivity up to 150 μm (y) | x/y | State of roots | Sharpness of X-ray image | Brightness of X-ray image | Total evaluation |
|---|---|---|---|---|---|---|---|---|
| CompEx. 1 | Support body | 5.0% | 39.3% | 0.13 | Non-columnar | C | B | D |
| CompEx. 2 | (polyimide | 5.0% | 44.0% | 0.11 | Non-columnar | B | B | D |
| Ex. 1 | film) | 5.4% | 39.3% | 0.14 | A | B | B | B |
| Ex. 2 | | 5.4% | 44.0% | 0.12 | A | A | B | B |
| Ex. 3 | | 5.4% | 50.0% | 0.11 | A | B | B | B |
| Ex. 4 | | 6.7% | 39.3% | 0.17 | A | A | A | A |
| Ex. 5 | | 8.6% | 39.3% | 0.22 | A | A | A | A |
| Ex. 6 | | 8.6% | 44.0% | 0.20 | A | A | A | A |
| CompEx. 3 | | 9.0% | 39.3% | 0.23 | Fused | C | A | D |
| CompEx. 4 | | 9.0% | 44.0% | 0.20 | Fused | D | A | D |
| CompEx. 5 | Photoelectric | 5.0% | 39.3% | 0.13 | Non-columnar | D | B | D |
| CompEx. 6 | conversion | 5.0% | 44.0% | 0.11 | Non-columnar | D | B | D |
| Ex. 7 | element | 5.4% | 39.3% | 0.14 | A | A | B | B |
| Ex. 8 | | 5.4% | 44.0% | 0.12 | A | A | B | B |
| Ex. 9 | | 5.4% | 50.0% | 0.11 | A | B | B | B |
| Ex. 10 | | 6.7% | 39.3% | 0.17 | A | A | A | A |
| Ex. 11 | | 8.6% | 39.3% | 0.22 | A | A | A | A |
| Ex. 12 | | 8.6% | 44.0% | 0.20 | A | A | A | A |

TABLE 1-continued

| Deposition target | X-ray absorptivity up to 5 μm (x) | X-ray absorptivity up to 150 μm (y) | x/y | State of roots | Sharpness of X-ray image | Brightness of X-ray image | Total evaluation |
|---|---|---|---|---|---|---|---|
| CompEx. 7 | 9.0% | 39.3% | 0.23 | Fused | C | A | D |
| CompEx. 8 | 9.0% | 44.0% | 0.20 | Fused | D | A | D |

Deposition target: a target on which a phosphor is to be deposited.
X-ray absorptivity up to 5 μm (x): an X-ray absorptivity x of a thickness region from a main surface of a scintillator layer facing a support body up to a height of 5 μm.
X-ray absorptivity up to 150 μm (y): an X-ray absorptivity y of a thickness region from the main surface of the scintillator layer facing the support body up to a height of 150 μm.
x/y: a ratio (x/y) of the X-ray absorptivity x of the thickness region from the main surface of the scintillator layer facing the support body up to the height of 5 μm to the X-ray absorptivity y of the thickness region from the main surface of the scintillator layer facing the support body up to the height of 150 μm.
State of roots: a state of roots of columnar crystals, which is an evaluation item relating to whether columnar crystals are formed and whether the columnar crystals are independent from each other.

REFERENCE SIGNS LIST

11 Support body
12, 12' Scintillator layer
121, 121' Layer other than base layer
122, 122' Base layer
13, 13' Reflecting layer
20 Photoelectric conversion element panel
30 First radiation detector
31 Second radiation detector
40 Vapor deposition apparatus
41 Vacuum vessel
42 Vacuum pump
43 Deposition substrate
44 Holder
45 Rotation mechanism
46 Rotation shaft
47, 47a, 47b, 47c Deposition source
48 Shutter
50 Scintillator layer thickness direction
60 Columnar crystal height
80 Columnar crystal root
90 Columnar crystal tip
91 Columnar crystal growth starting surface
92 Columnar crystal growth ending surface
93 Surface of side where support body is located with respect to scintillator layer
94 Surface of side where support body is not located with respect to scintillator layer
95 Surface of side where photoelectric conversion element panel is located with respect to scintillator layer
96 Surface of side where photoelectric conversion element panel is located with respect to scintillator layer

What is claimed is:

1. A scintillator panel comprising:
a support body; and
a scintillator layer formed on the support body,
the scintillator layer including a phosphor, and
the phosphor comprising a plurality of columnar crystals,
wherein the scintillator layer has a columnar crystal growth starting surface on which roots of the plurality of columnar crystals exist independently from each other, and
wherein, in the scintillator layer, a thickness region from the columnar crystal growth starting surface up to a height of 5 μm has a radiation absorptivity x of from 5.4 to 8.6%.

2. The scintillator panel according to claim 1, wherein in the scintillator layer, a ratio (x/y) of the radiation absorptivity x of the thickness region from the columnar crystal growth starting surface up to the height of 5 μm to a radiation absorptivity y of a thickness region from the columnar crystal growth starting surface up to a height of 150 μm is from 0.12 to 0.22.

3. The scintillator panel according to claim 1, wherein in the scintillator layer, a ratio (x/y) of the radiation absorptivity x of the thickness region from the columnar crystal growth starting surface up to the height of 5 μm to a radiation absorptivity y of a thickness region from the columnar crystal growth starting surface up to a height of 150 μm is from 0.17 to 22.

4. The scintillator panel according to claim 1, wherein in the scintillator layer, the thickness region from the columnar crystal growth starting surface up to the height of 5 μm has a radiation absorptivity x of from 5.4 to 8.6% and a thickness region from the columnar crystal growth starting surface up to a height of 150 μm has a radiation absorptivity y of from 39.3 to 44.0%.

5. The scintillator panel according to claim 1, wherein the columnar crystals of the scintillator layer are gas phase deposits.

6. A radiation detector comprising the scintillator panel according to claim 1 and a photoelectric conversion element panel.

7. A radiation detector comprising:
a photoelectric conversion element panel; and
a scintillator layer formed on the photoelectric conversion element panel,
the scintillator layer including a phosphor, and
the phosphor comprising a plurality of columnar crystals,
wherein the scintillator layer has a columnar crystal growth starting surface on which roots of the plurality of columnar crystals exist independently from each other, and
wherein, in the scintillator layer, a thickness region from the columnar crystal growth starting surface up to a height of 5 μm has a radiation absorptivity x of from 5.4 to 8.6%.

8. The radiation detector according to claim 7, wherein in the scintillator layer, a ratio (x/y) of the radiation absorptivity x of the thickness region from the columnar crystal growth starting surface up to the height of 5 μm to a radiation absorptivity y of a thickness region from the columnar crystal growth starting surface up to a height of 150 μm is from 0.12 to 0.22.

9. The radiation detector according to claim 7, wherein in the scintillator layer, a ratio (x/y) of the radiation absorptivity x of the thickness region from the columnar crystal growth starting surface up to the height of 5 μm to a radiation absorptivity y of a thickness region from the columnar crystal growth starting surface up to a height of 150 μm is from 0.17 to 0.22.

10. The radiation detector according to claim 7, wherein in the scintillator layer, the thickness region from the columnar crystal growth starting surface up to the height of 5 μm has a radiation absorptivity x of from 5.4 to 8.6% and a thickness region from the columnar crystal growth starting surface up to a height of 150 μm has a radiation absorptivity y of from 39.3 to 44.0%.

11. The radiation detector according to claim 7, wherein the columnar crystals of the scintillator layer are gas phase deposits.

* * * * *